US009347711B2

(12) United States Patent
Mieda

(10) Patent No.: US 9,347,711 B2
(45) Date of Patent: May 24, 2016

(54) CHEMICAL HEAT ACCUMULATOR

(75) Inventor: Hiroshi Mieda, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 1154 days.

(21) Appl. No.: 13/065,232

(22) Filed: Mar. 17, 2011

(65) Prior Publication Data

US 2011/0226447 A1    Sep. 22, 2011

(30) Foreign Application Priority Data

Mar. 22, 2010  (JP) .................... 2010-065350
Nov. 30, 2010  (JP) .................... 2010-267127

(51) Int. Cl.
*F28D 15/00* (2006.01)
*F28D 7/02* (2006.01)
*F28D 20/00* (2006.01)

(52) U.S. Cl.
CPC .............. *F28D 7/022* (2013.01); *F28D 20/003* (2013.01); *Y02E 60/142* (2013.01); *Y02E 70/30* (2013.01)

(58) Field of Classification Search
CPC ...... Y02B 30/62; Y02B 30/16; Y02B 30/625; F28D 20/003; F28D 7/022; B01J 19/0006; Y02E 60/142; Y02E 70/30
USPC .................. 165/104.12, 909; 62/102, 477; 60/39.511, 39.5; 422/109, 173
See application file for complete search history.

(56) References Cited

U.S. PATENT DOCUMENTS

| 4,055,962 A | * | 11/1977 | Terry ...................... F01K 25/00 165/104.12 |
| 4,616,692 A | * | 10/1986 | Yasuda ................. F28D 20/003 165/104.12 |
| 4,623,018 A | * | 11/1986 | Takeshita ................ F25B 17/00 165/104.12 |
| 4,765,395 A | * | 8/1988 | Paeye ................... F25B 17/083 165/104.12 |
| 5,085,271 A | * | 2/1992 | Yanadori ............... F25B 17/086 165/104.12 |

(Continued)

FOREIGN PATENT DOCUMENTS

JP    2009-262748    11/2009

OTHER PUBLICATIONS

Office Action mailed Mar. 6, 2012 in corresponding Japanese Application No. 2010-267127 with English translation.

(Continued)

*Primary Examiner* — Frantz Jules
*Assistant Examiner* — Claire Rojohn, III
(74) *Attorney, Agent, or Firm* — Harness, Dickey & Pierce, P.L.C.

(57) ABSTRACT

A chemical heat accumulator includes first- to Mth-stage heat storage units and a condensing part. Each heat storage unit includes a reaction vessel housing first reactant, a container housing second reactant, and a connection passage connecting the reaction vessel and the container for guiding the second reactant from the container to the reaction vessel. The connection passage is provided with an opening/closing member for opening and closing the connection passage. The reaction vessel of the Mth-stage heat storage unit is thermally connected with an object to be heated. The reaction vessel of a (N−1)th-stage heat storage unit is thermally connected with the container of an Nth-stage heat storage unit. M is an integer equal to or greater than 2, and N is an integer equal to or greater than 2 and equal to or less than M.

16 Claims, 14 Drawing Sheets

(56) References Cited

U.S. PATENT DOCUMENTS

| | | | | |
|---|---|---|---|---|
| 5,127,470 | A | * | 7/1992 | Inaba et al. ............. 165/104.12 |
| 5,628,183 | A | * | 5/1997 | Rice .................... F01K 21/042 122/7 B |
| 6,519,946 | B2 | * | 2/2003 | Iwamoto ................ F02C 6/18 60/39.5 |
| 6,886,092 | B1 | * | 4/2005 | Douglass et al. .............. 712/37 |
| 2010/0263832 | A1 | * | 10/2010 | Dalla Betta ............... F01K 3/12 165/104.12 |

OTHER PUBLICATIONS

Office action dated Apr. 28, 2012 in corresponding Chinese Application No. 2011 10070287.1.

* cited by examiner

CHEMICAL HEAT ACCUMULATOR

CROSS REFERENCE TO RELATED APPLICATION

This application is based on Japanese Patent Applications No. 2010-65350 filed on Mar. 22, 2010 and No. 2010-267127 filed on Nov. 30, 2010, the disclosure of which are incorporated herein by reference.

FIELD OF THE INVENTION

The present invention relates to a chemical heat accumulator that utilizes the heat of reaction of a substance to extract heat and carries out pyrolysis to store heat.

BACKGROUND OF THE INVENTION

A heat recovery device that recovers exhaust heat from thermal components is, for example, described in JP-B2-8-6608 corresponding to U.S. Pat. No. 5,127,470. In the described heat recovery device, a reaction material in a first chemical heat accumulator is heated by high-temperature exhaust gas exhausted from thermal components to discharge reacted material, and a gas obtained as the result of heating the reaction material is subjected to heat recovery at a heat exchanger. Thereafter, a reacted material in a second chemical heat accumulator is heated and vaporized to cause reaction with a reaction material in the second chemical heat accumulator. Further, output is extracted by passing water through a container holding the reacted material in the first chemical heat accumulator and further passing it through a container holding the reaction material in the second chemical heat accumulator to produce high-temperature vapor.

In the described heat recovery device, it is possible to appropriately extract the output according to demand. Further, it is possible to obtain vapor having the temperature higher than the temperature of the exhaust gas from the thermal components.

However, a certain amount or more of exhaust heat (external heat) obtained from a heat engine needs to constantly exist to appropriately extract output according to demand. For this reason, if such a heat recovery device is employed to a system involving such an amount-of-heat fluctuation that the amount of heat obtained from a heat engine is reduced with time, there is a possibility that the reaction material in the first chemical heat accumulator cannot discharge the reacted material because of an insufficient amount of heat. Therefore, when the described heat recovery device is employed to a system utilizing exhaust heat from thermal components involving an amount-of-heat fluctuation, a problem that heat recovery operation is not established may arise.

SUMMARY OF THE INVENTION

In consideration of the foregoing matter, it is an object of the present invention to provide a chemical heat accumulator for storing an external heat, which is capable of generating heat higher in temperature than the external heat even if the external heat does not exist in a heat release mode.

In a chemical heat accumulator according to a first aspect, heat storage units are provided in M stages, where M is an integer not less than 2. The heat storage unit of the respective stage has a reaction vessel housing first reactant, a container housing second reactant, and a connection passage connecting the reaction vessel and the container with each other. The connection passage guides the second reactant from the container to the reaction vessel to react the first reactant and the second reactant with each other to thereby produce a compound in the reaction vessel. The reaction vessel houses a regeneration heat exchanger for heating the compound by external heat generated outside of a system of the reaction. The connection passage is provided with an opening/closing member. The connection passage is opened and closed by the opening/closing member. A condensing part is configured to condense the second reactant in a gas state produced when the compound is separated into the first reactant and the second reactant in the reaction vessel of the respective heat storage unit. The reaction vessel of an Mth-stage heat storage unit is thermally connected with an object to be heated. The reaction vessel of a (N−1)th-stage heat storage unit is thermally connected with the container of an Nth-stage heat storage unit, where N is an integer equal to or greater than 2 and equal to or less than M.

In such a structure, in the respective heat storage unit, the second reactant heated in the container flows into the reaction vessel through the connection passage. The second reactant reacts with the first reactant in the reaction vessel to produce the compound. In this reaction, heat of reaction is generated.

The reaction vessel of the (N−1)th-stage heat storage unit is thermally connected with the container of the Nth-stage heat storage unit. At this time, therefore, the heat of reaction generated in the reaction vessel of the (N−1)th-stage heat storage unit is transmitted to the container of the Nth-stage heat storage unit. Then, the second reactant housed in the container of the Nth-stage heat storage unit is heated by the heat transmitted from the reaction vessel of the (N−1)-stage heat storage unit.

As described above, the heat of reaction generated in the reaction vessel of the (N−1)th-stage heat storage unit is transmitted to the container of the Nth-stage heat storage unit. The second reactant heated by this heat flows into the reaction vessel of the Nth-stage heat storage unit and reacts with the first reactant again to generate heat of reaction. The reaction vessel of the Mth-stage heat storage, unit, that is, the heat storage unit in the last stage is thermally connected with the object to be heated. Therefore, the object can be heated by heat whose temperature is raised in the respective heat storage units and which is higher in temperature than external heat.

In such a heat release mode, heat higher in temperature than the external heat can be outputted even without the presence of the external heat during heat releasing.

In a chemical heat accumulator according to a second aspect, the container of the first-stage heat storage unit is thermally connected with the reaction vessel of the first-stage heat storage unit.

In such a structure, the second reactant housed in the container of the first-stage heat storage unit is heated by part of heat of reaction generated in the reaction vessel of the first-stage heat storage unit. Therefore, it is unnecessary to separately provide a heating source for heating the second reactant. Thus, the advantage of the chemical heat accumulator according to the first aspect can be achieved by a simple configuration. Since an external heating source is not required at all during the heat releasing, the chemical heat accumulator according to the second aspect can be employed to a wide range of systems.

In a chemical heat accumulator according to a third aspect, the container of the first-stage heat storage unit is thermally connected with the container of a second-stage heat storage unit.

In such a structure, the second reactant housed in the container of the first-stage heat storage unit is heated by part of heat transmitted to the container of the second-stage heat storage unit. Therefore, it is unnecessary to separately provide a heating source for heating the second reactant. Thus, the advantage of the chemical heat accumulator according to the first aspect can be achieved by a simple configuration. Since an external heating source is not required at all during the heat releasing, the chemical heat accumulator according to the third aspect can be employed to a wide range of systems.

In a chemical heat accumulator according to a fourth aspect the container of the first-stage heat storage unit is thermally connected with a heating source lower in temperature than external heat.

In such a structure, the second reactant housed in the container of the first-stage heat storage unit is heated by heat from the heating source. Therefore, the advantages of the chemical heat accumulator according to the first aspect can be more reliably achieved.

In a chemical heat accumulator according to a fifth aspect, the condensing part is a condenser having a thermal storage medium that stores heat of condensation generated when the gaseous second reactant is condensed. The heating source is the condenser.

In such a structure, the second reactant housed in the container of the first-stage heat storage unit is heated by heat of condensation generated when the gaseous second reactant is condensed. Therefore, the advantage of the chemical heat accumulator according to the fourth aspect can be achieved by such a simple configuration that the condenser is just provided with the thermal storage medium.

In a chemical heat accumulator according to a sixth aspect, the heating source is thermally connected with an external heat source that generates the external heat.

In such a structure, a surplus external heat generated at the external heat source is used to heat the second reactant housed in the container of the first-stage heat storage unit. Therefore, it is possible to effectively utilize the heat generated at the external heat source to enhance the efficiency of utilization of heat.

In a chemical heat accumulator according to a seventh aspect, in the respective heat storage unit, the maximum ultimate temperature [K] of the second reactant in the container is less than the critical temperature [K] of the second reactant. The respective heat storage unit is configured such that the withstand pressure [Pa] thereof is higher than a saturated vapor pressure [Pa] of the second reactant at the critical temperature.

Thus, in each of the heat storage units, in a case where the maximum ultimate temperature [K] of the second reactant in the container is less than the critical temperature [K] of the second reactant, the heat storage unit is so set that the withstand pressure thereof is higher than the saturated vapor pressure [Pa] of the second reactant in the container at the critical temperature. Therefore, it is unnecessary to provide all the heat storage units with the same pressure resistant structure. Each of the heat storage units can be provided with a pressure resistant structure corresponding to the respective withstand pressure Pv.

In a chemical heat accumulator according to an eighth aspect, the maximum ultimate temperature Tm [K] of the second reactant in the container is equal to or higher than the critical temperature Tc [K] of the second reactant. The respective heat storage unit is configured such that the withstand pressure thereof satisfies a relation of $Pv > znRTm/Vm$, in which n is the molecular weight [mol] of the second reactant in the containers; Vm is the volumetric capacity [m$^3$] of the containers; z is a compressibility factor; and R is a gas constant.

Thus, in each of the heat storage units, in a case where the maximum ultimate temperature Tm [K] of the second reactant in the container is equal to or higher than the critical temperature Tc [K] of the second reactant, the withstand pressure Pv of the heat storage units is so set that the above relation is satisfied. That is, it is unnecessary to provide, all the heat storage units with the same pressure resistant structure. Each of the heat storage units can be provided with a pressure resistant structure corresponding to the respective withstand pressure Pv.

In a chemical heat accumulator according to a ninth aspect, the (N−1)th-stage heat storage unit and the Nth-stage heat storage unit are configured such that the amount of heat Qr(N−1) generated in the (N−1)th-stage heat storage unit and the amount of heat QrN generated in the Nth-stage heat storage unit satisfy a relation of:

$$Qr(N-1)\cdot \Delta Hr/\Delta He < QrN < \{Qr(N-1) - Qr(N-1)HM\cdot(Ta(N-1) - Tair) - QeNHM\cdot(TaN - Tair)\}\cdot \Delta Hr/\Delta He$$

where, ΔHr is the heat of reaction [J/mol] of a reaction for producing the compound from the first reactant and the second reactant; ΔHe is the latent heat [J/mol] of vaporization of the second reactant; Qr(N−1)HM is the heat capacity [J/K] of the reaction vessel of the (N−1)th-stage heat storage unit; QeNHM is the heat capacity [J/K] of the reaction vessel of the Nth-stage heat storage unit; Ta(N−1) is the target temperature [K] in the reaction vessel of the (N−1)th-stage heat storage unit when the first reactant and the second reactant reacted with each other; TaN is the target temperature [K] in the reaction vessel of the Nth-stage heat storage unit when the first reactant and the second reactant are reacted with each other; Tair is outside air temperature [K]; Qr(N−1) is the amount of heat [J] generated by reacting the first reactant and the second reactant with each other in the reaction vessel of the (N−1)th-stage heat storage unit; and QrN is the amount of heat [J] generated by reacting the first reactant and the second reactant with each other in the reaction vessel of the Nth-stage heat storage unit.

In a chemical heat accumulator according to a tenth aspect, the object to be heated is a high-temperature part of a heat engine that converts heat energy into kinetic energy. The heat engine includes the high-temperature part for heating and expanding working gas and a low-temperature part for cooling and contracting working gas.

In a chemical heat accumulator according to an eleventh aspect, the first reactant is calcium oxide and the second reactant is water.

In such a case, it possible to extract output higher in temperature than the external heat only by two-stage heat storage units.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereafter, description will be given to exemplary embodiments with reference to the drawings. Like parts are designated by like reference numbers throughout the following embodiments, and a description thereof will not be repeated.

(First Embodiment)

A first embodiment will be described with reference to FIG. 1 to FIG. 7. A chemical heat accumulator according to the first embodiment stores solar heat and utilizes the stored heat at a heat engine when desired.

Figure 1:
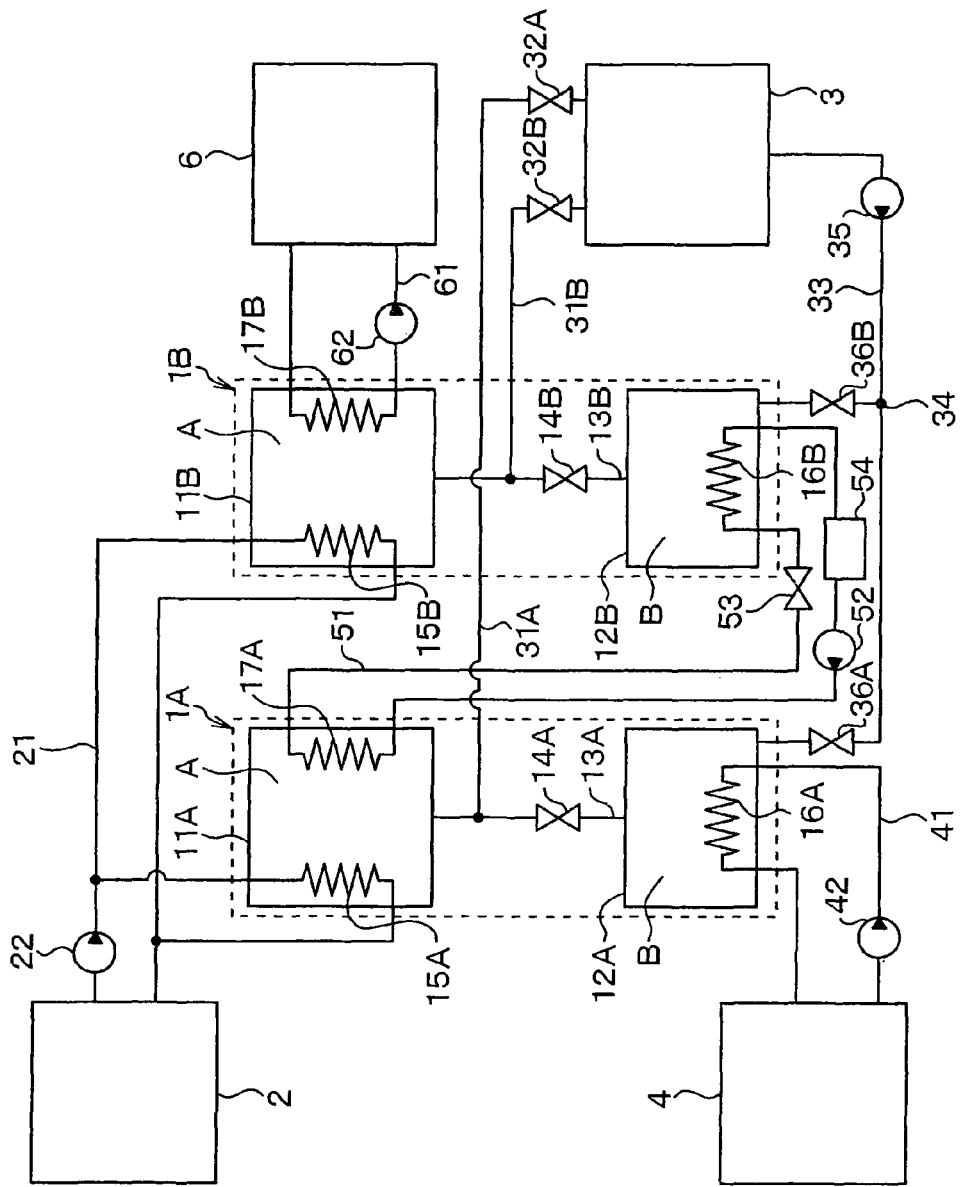
FIG. 1 is an overall block diagram illustrating a chemical heat accumulator according to a first embodiment of the present invention.

FIG. 1 is an overall block diagram illustrating the chemical heat accumulator according to the first embodiment. The chemical heat accumulator of the present embodiment can be switched between a heat release mode, a heat storage mode, and a heat storage sustainment mode. In the heat release mode, an object to be heated is heated by heat of reaction generated when a first reactant A and a second reactant B are caused to react with each other to produce a compound. In the heat storage mode, external heat that is generated outside a reaction system by separating a compound into a first reactant A and a second reactant B is stored. In the heat storage sustainment mode, a state in which external heat is stored is sustained.

In the present embodiment, calcium oxide (CaO) is used as the first reactant A and water is used as the second reactant B. The compound is calcium hydroxide. The object to be heated is a heat engine and the external heat is solar heat.

The chemical heat accumulator includes first- to Mth-stage heat storage units 1A, 1B. Here, M is an integer equal to or greater than 2. Each of the heat storage unit 1A, 1B has a reaction vessel 11A, 11B housing calcium oxide in a solid state, a container 12A, 12B housing water in a liquid state, and a connection passage 13A, 13B guiding water stored in the container 12A, 12B to the reaction vessel 11A; 11B.

The reaction vessel 11B of the Mth-stage heat storage unit 1B, that is, the heat storage unit of the last stage is thermally connected to the object to be heated. The reaction vessel 11A of a (N−1)th stage heat storage unit 1A is thermally connected to the container 12B of an Nth-stage heat storage unit 1B. Here, N is an integer equal to or greater than 2 and equal to or less than M.

In the present embodiment, the chemical heat accumulator exemplarily includes a first-stage of heat storage unit 1A and a second-stage of heat storage unit 1B. That is, the heat storage units 1A, 1B are provided in two stages, for example. Therefore, structure and operation of the chemical heat accumulator will be described hereinafter with respect to the case where the heat storage units 1A, 1B are provided in two stages as an example.

The connection passages 13A, 13B are respectively provided with first on-off valves (opening/closing members) 14A, 14B that open and close the connection passages 13A, 13B. The first on-off valves 14A, 14B are capable of adjusting the passage areas of the connection passages 13A, 13B. In the reaction vessels 11A, 11B, there are respectively housed regeneration heat exchangers 15A, 15B that heat the interior of the reaction vessels 11A, 11B by solar heat.

The chemical heat accumulator of the present embodiment includes: a light and heat collecting device 2 as an external heat source that concentrates sunlight on a pipe installed in front of a curved mirror using the curved mirror and heats a first heating medium flowing in the pipe; and a first heating medium circuit 21 for circulating the first heating medium between the light and heat collecting device 2 and the regeneration heat exchangers 15A, 15B. In the first heating medium circuit 21, there is installed a first heating medium pump 22 for circulating the first heating medium.

For this reason, the first heating medium heated by sunlight (solar heat) at the light and heat collecting device 2 is fed to the regeneration heat exchangers 15A, 15B and the interior of each of the reaction vessels 11A, 11B is heated, by the first heating medium.

The water housed in the containers 12A, 12B is guided to the reaction vessels 11A, 11B through the connection passages 13A, 13B. In the reaction vessels 11A, 11B, the calcium oxide and the water react with each other and thus calcium hydroxide is produced. Since this reaction is an exoergic reaction, heat of reaction is generated. Meanwhile, when the calcium hydroxide produced in the reaction vessels 11A, 11B is heated by the regeneration heat exchangers 15A, 15B, the calcium hydroxide is separated into calcium oxide in a solid state and water in a liquid state (water vapor).

The chemical heat accumulator includes a condenser 3 as a condensing part that condenses the water vapor produced when the calcium hydroxide is separated. This condenser 3 is a heat exchanger that performs heat exchange between the water vapor and outside air and condenses the water vapor.

To the inlet side of the condenser 3, there are connected one ends of condenser inlet passages 31A, 31B for guiding the water vapor flowing out of the reaction vessels 11A, 11B to the condenser 3. The other ends of the condenser inlet passages 31A, 31B are connected to the areas of the connection passages 13A, 13B between the first on-off valves 14A, 14B and the reaction vessels 11A, 11B.

The condenser inlet passages 31A, 31B are respectively provided with second on-off valves 32A, 32B that open and close the condenser inlet passages 31A, 31B. The second on-off valves 32A, 32B are capable of adjusting the passage areas of the condenser inlet passages 31A, 31B.

To the outlet side of the condenser 3, there is connected one end of the condenser outlet passage 33 for guiding water condensed at the condenser 3 to the containers 12A, 12B. The condenser outlet passage 33 is provided with a branch part 34 that bifurcates the flow of water flowing out of the condenser 3. One flow of water bifurcated at the branch part 34 is introduced into the container 12A of the first-stage heat storage unit 1A; and the other flow of water is introduced into the container 12B of the second-stage heat storage unit 1B.

On the upstream side of the branch part 34 in the condenser outlet passage 33, there is placed a water pump 35 that pumps the water to the containers 12A, 12B. On the downstream side of the branch part 34 in the condenser outlet passage 33, there are respectively provided third on-off valves 36A, 36B that open and close the condenser outlet passage 33. The third on-off valves 36A, 36B are capable of adjusting the passage area of the condenser outlet passage 33.

The container (hereafter, referred to as first container 12A) of the first-stage heat storage unit 1A is thermally connected with a heating source for heating the water housed in the first container 12A. In the present embodiment, the heating source is heat stored in a heat accumulator 4 that stores a part of solar heat collected by the light and heat collecting device 2.

More specific description will be given. In the first container 12A, there is housed a first water heating heat exchanger 16A for heating the water housed in the first container 12A. The first water heating heat exchanger 16A is connected with the heat accumulator 4 through a second heating medium circuit 41. In the second heating medium circuit 41, there is placed a second heating medium pump 42' for circulating a second heating medium.

For this reason, the second heating medium heated by the heat stored in the heat accumulator 4 is fed to the first water heating heat exchanger 16A, and the water in the first container 12A is heated by the second heating medium. The reaction vessel (hereafter, referred to as first reaction vessel 11A) of the first-stage heat storage unit 1A is thermally connected with the container (hereafter, referred to as second container 12B) of the second-stage heat storage unit 1B. Further, the chemical heat accumulator includes: a first heat recovering heat exchanger 17A placed in the first reaction vessel 11A; a second water heating heat exchanger 16B placed in the container (hereafter, referred to as second container 12B) of the second-stage heat storage unit 1B; and a heat-of-reaction transporting circuit 51 that circulates a third heating medium between the first heat recovering heat exchanger 17A and the second water heating heat exchanger 16B.

The first heat recovering heat exchanger 17A is a heat exchanger that heats the third heating medium by heat of reaction generated by reaction between the calcium oxide and the water in the first reaction vessel 11A. The second water heating heat exchanger 16B is a heat exchanger that performs heat exchange between the third heating medium heated at the first heat recovering heat exchanger 17A and water in the second container 12B. For this reason, heat of reaction generated in the first reaction vessel 11A is transmitted to the second water heating heat exchanger 16B through the third heating medium and the water in the second container 12B is heated by the transmitted heat.

A third heating medium pump 52 is placed between the outlet of the second water heating heat exchanger 16B and the inlet of the first heat recovering heat exchanger 17A in the heat-of-reaction transporting circuit 51. The third heating medium pump 52 circulates the third heating medium in the heat-of-reaction transporting circuit 51. A fourth on-off valve 53 is placed between the outlet of the first heat recovering heat exchanger 17A and the inlet of the second water heating heat exchanger 16B in the heat-of-reaction transporting circuit 51. The fourth on-off valve 53 opens and closes the heat-of-reaction transporting circuit 51. The fourth on-off valve 53 is capable of adjusting the passage area of the heat-of-reaction transporting circuit 51.

A reservoir container 54 is placed between the outlet of the second water heating heat exchanger 16B and the inlet of the third heating medium pump 52 in the heat-of-reaction transporting circuit 51. The reservoir container 54 absorbs a variation in the volume of the third heating medium.

In the present embodiment, the reservoir container 54 is configured so as to have a volumetric capacity sufficient to house all the third heating medium in the first heat recovering heat exchanger 17A and the second water heating heat exchanger 16A. This makes it possible, in the heat storage mode, to retain the third heating medium in the reservoir container 54 and create a state in which the first heat recovering heat exchanger 17A and the second water heating heat exchanger 16A are not filled with the third heating medium. Therefore, the operating efficiency of the chemical heat accumulator can be enhanced.

The reaction vessel (hereafter, referred to as second reaction vessel 11B) of the second-stage heat storage unit 1B is thermally connected with a heat engine 6 as an object to be heated.

Specifically, the chemical heat accumulator includes: a second heat recovering heat exchanger 17B placed in the second reaction vessel 11B; and a heat output circuit 61 that circulates a fourth heating medium between the second heat recovering heat exchanger 17B and the heat engine 6. The second heat recovering heat exchanger 17B is a heat exchanger that heats the fourth heating medium by heat of reaction generated by reaction between the calcium oxide and the water in the second reaction vessel 11B. For this reason, the heat of reaction generated in the second reaction vessel 11B is transmitted to the heat engine 6 through the fourth heating medium.

A fourth heating medium pump 62 is placed between the outlet of the second heat recovering heat exchanger 17B and the inlet of the heat engine 6 in the heat output circuit 61. The fourth heating medium pump 62 circulates the fourth heating medium in the heat output circuit 61.

Description will be given to the concrete configuration of the first and second reaction vessels 11A, 11B and the first and second containers 12A, 12B. The first and second reaction vessels 11A, 11B and the first and second containers 12A, 12B have substantially the same configuration. Therefore, the configuration of the first reaction vessel 11A will be described hereinafter and the description of the structures of the second reaction vessel 11B and the first and second containers 12A, 12B will be omitted.

Figure 2:
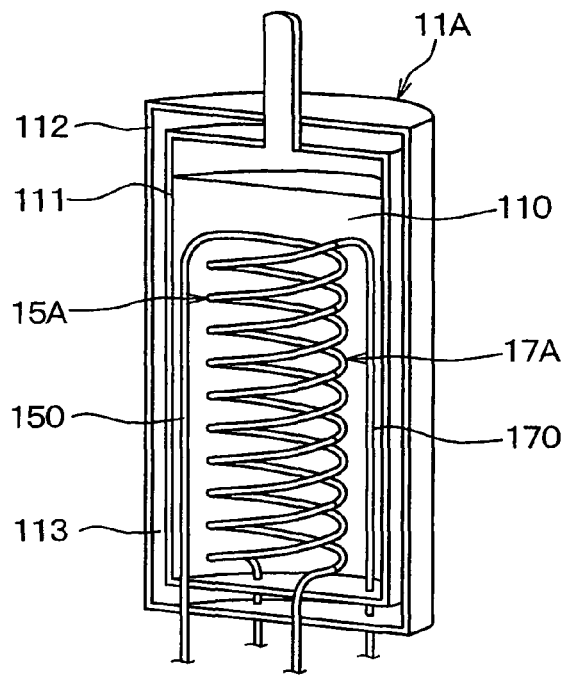
FIG. 2 is an exploded perspective view illustrating a first reaction vessel according to the first embodiment.

FIG. 2 is an exploded perspective view illustrating the first reaction vessel 11A of the chemical heat accumulator. As illustrated in FIG. 2, the first reaction vessel 11A is formed in a cylindrical shape and has a double pipe structure.

Specifically, the first reaction vessel 11A includes: an inner wall part 111 forming an intra-reaction vessel space 110 in which calcium oxide is housed; and an outer wall part 112 forming the contour of the first reaction vessel 11A. The inner wall part 111 is placed on the innermost side and formed substantially in a cylindrical shape. The outer wall part 112 is placed outside the inner wall part 111 and formed substantially in the cylindrical shape larger than the inner wall part 111.

Between the inner wall part 111 and the outer wall part 112, there is provided a heat insulation layer 113 that insulates the intra-reaction vessel space 110. The heat insulation layer 113 is formed by evacuating the space between the inner wall part 111 and the outer wall part 112 or filling the space between the inner wall part 111 and the outer wall part 112 with heat insulating material or air. This suppresses heat release to outside the first reaction vessel 11A and thus the operating efficiency of the chemical heat accumulator can be enhanced.

The regeneration heat exchanger 15A is formed by spirally winding a first heating medium pipe 150 through which the first heating medium flows in the infra-reaction vessel space 110 several times. Similarly, the first heat recovering heat exchanger 17A is formed by spirally winding a third heating medium pipe 170 through which the third heating medium flows in the intra-reaction vessel space 110 several times. In the present embodiment, the regeneration heat exchanger 15A and the first heat recovering heat exchanger 17A are provided with a double spiral structure in which the first heating medium pipe 150 and the third heating medium pipe 170 are wound in the shape of double spiral with a substantially constant distance maintained therebetween.

Next, an operation of the present embodiment having the above configuration will be described with reference to FIG. 1. First, an operation in the heat release mode will be described.

In the heat release mode, the first and fourth on-off valves 14A, 14B, 53 are fully open; the second and third on-off valves 32A, 32B, 36A, 36B are fully closed; the second to fourth heating medium pumps 42, 52, 62 are in operation; and the first heating medium pump 22 and the water pump 35 are at a stop. Therefore, the water in the first container 12A is heated and vaporized by the heat stored in the heat accumulator 4 and the resulting water vapor flows into the first reaction vessel 11A through the connection passage 13A. In the first reaction vessel 11A, the calcium oxide housed in the first reaction vessel 11A and the water vapor fed from the first container 12A react with each other. As a result, calcium hydroxide is produced and heat of reaction is generated.

The heat of reaction generated in the first reaction vessel 11A during the above reaction is transmitted to the second container 12B through the third heating medium. Thus, the water housed in the second container 12B is heated and vaporized by the heat. The water vapor obtained as the result of vaporization in the second container 12B flows into the second reaction vessel 11B through the connection passage 13B. In the second reaction vessel 11B, the calcium oxide housed in the second reaction vessel 11B and the water vapor fed from the second container 12B react with each other. As a result, calcium hydroxide is produced and heat of reaction is generated. The heat of reaction generated during this reaction is transmitted to the heat engine 6 through the fourth heating medium.

The reaction occurring in the first and second reaction vessels 11A, 11B in the heat release mode is expressed by the following Chemical Formula 1:

$$CaO + H_2O \rightarrow Ca(OH)_2 \quad \text{(Chemical Formula 1)}$$

Next, an operation in the heat storage mode will be described. The heat storage mode is carried out after the heat release mode.

In the heat storage mode, the second on-off valves 32A, 32B are fully open; the first, third, and fourth on-off valves 14A, 14B, 36A, 36B, 53 are fully closed; the first heating medium pump 22 is in operation; and the second to fourth heating medium pumps 42, 52, 62 and the water pump 35 are at a stop. Therefore, the calcium hydroxide in the first and second reaction vessels 11A, 11B is heated by solar heat collected at the light, and heat collecting device 2 and is separated into calcium oxide and water vapor. As a result, the calcium hydroxide in the first and second reaction vessels 11A, 11B is regenerated into calcium oxide. Consequently, solar heat can be stored.

The reaction occurring in the first and second reaction vessels 11A, 11B in the heat storage mode is expressed by the following Chemical Formula 2:

$$Ca(OH)_2 \rightarrow CaO + H_2O\uparrow \quad \text{(Chemical Formula 2)}$$

Meanwhile, the water vapor produced in the first and second reaction vessels 11A, 11B flows into the condenser 3 through the condenser inlet passages 31A, 31B. The water vapor flowed into the condenser 3 is cooled and condensed by outside air and retained in the condenser 3.

Next, an operation in the heat storage sustainment mode will be described. The heat storage sustainment mode is carried out after the heat storage mode.

In the heat storage sustainment mode, the setting of the on-off valves and the pumps is the same as in the heat storage mode, except that the second on-off valves 32A, 32B are fully closed. Therefore, the calcium oxide and the water are spatially isolated from each other and thus the heat storage state can be sustained.

At this time, the third on-off valves 36A, 36B are fully opened and the water pump 35 is operated. The water retained in the condenser 3 can be thereby returned to the first and second containers 12A, 12B through the condenser outlet passage 33. After the water retained in the condenser 3 is all returned to the first and second containers 12A, 12B, the third on-off valves 36A, 36B are fully closed and the water pump 35 is stopped.

The above-described step of returning the water retained in the condenser 3 to the first and second containers 12A, 12B may be carried out not only in the heat storage sustainment mode but also in the heat release mode and the heat storage mode.

Figure 3:
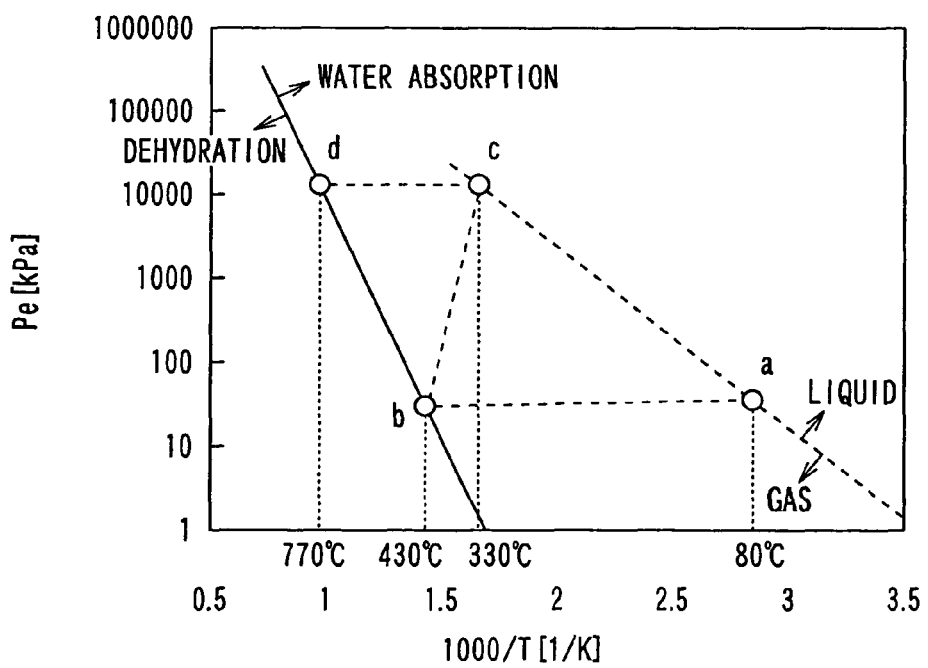
FIG. 3 is a graph showing an equilibrium line of the water absorption reaction of calcium oxide and a vapor-liquid equilibrium line of water in a heat release mode according to the first embodiment.

FIG. 3 is a graph showing an equilibrium line of the water absorption reaction of calcium oxide and a vapor-liquid equilibrium line of water in the heat release mode in the present embodiment. In FIG. 3, the horizontal axis indicates the reciprocal of temperature and the vertical axis indicates gas pressure. In FIG. 3, the solid line represents an equilibrium line of the water absorption reaction of calcium oxide; and the broken line represents a vapor-liquid equilibrium line of water.

As shown in FIG. 3, when the water in the first container 12A is heated to 80 degrees Celsius (° C.) in the heat release mode, the pressure in the first container 12A reaches point a. Then the pressure in the first reaction vessel 11A communicating with the first container 12A through the connection passage 13A becomes substantially equal to that in the first container 12A. Therefore, the temperature of calcium oxide in the first reaction vessel 11A rises to about 430° C. (point b) in conjunction with the reaction (water absorption reaction) represented by the above Chemical Formula 1.

Heat generated in the first reaction vessel 11A is recovered at the first heat recovering heat exchanger 17A. The recovered heat is given to the water in the second container 12B by the second water heating heat exchanger 16B through the third heating medium in the heat-of-reaction transporting circuit 51.

At this time, a temperature difference arising from heat transmission is produced between the first reaction vessel 11A and the second container 12B. In the present embodiment, the temperature difference between the first reaction vessel 11A and the second container 12B is about 100° C. In this case, the temperature of water in the second container 12B is about 330° C. Thus the vapor pressure of water in the second container 12B becomes about 10 Mpa as indicated by point c. The pressure in the second reaction vessel 11B communicating with the second container 12B through the connection passage 13B becomes substantially equal to that in the second container 12A.

Figure 4:
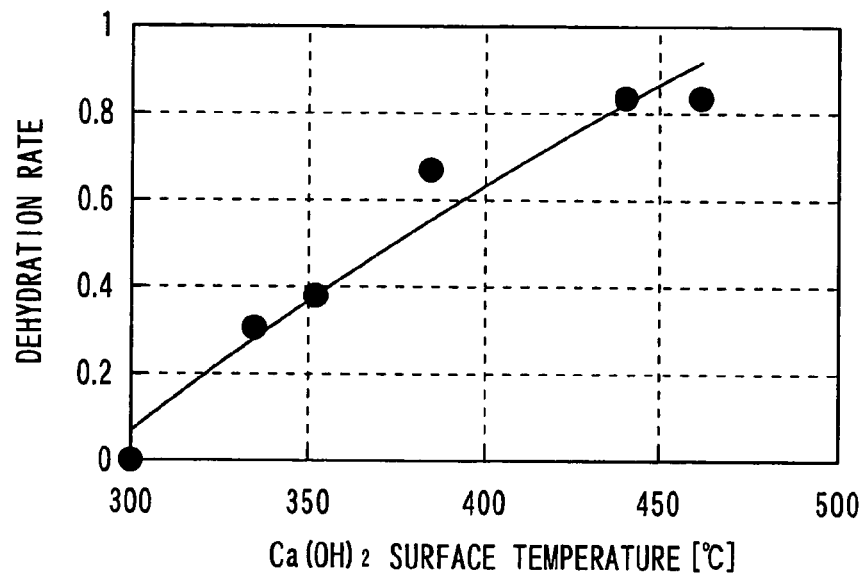
FIG. 4 is a graph showing a dehydration rate obtained when the temperature of calcium hydroxide is maintained for one hour in vacuum.

Therefore, the temperature of calcium oxide in the second reaction vessel 11B rises to about 770° C. (point d) in conjunction with the reaction (water absorption reaction) represented by the above Chemical Formula 1. The heat of reaction during this reaction is recovered at the second heat recovering heat exchanger 17B and the recovered heat is utilized at the heat engine 6:

FIG. 4 is a graph showing the dehydration rate (regeneration rate) obtained when the temperature of calcium hydroxide is maintained for one hour in vacuum. In FIG. 4, the horizontal axis indicates the surface temperature of calcium hydroxide and the vertical axis indicates the dehydration rate.

As shown in FIG. 4, the dehydration rate of calcium hydroxide becomes 0.8 or above by maintaining the temperature equal to or higher than 450° C. for one hour. Therefore, it is desired from a practical viewpoint to heat the calcium hydroxide to 450° C. or higher so as to regenerate the calcium hydroxide in the first and second reaction vessels 11A, 11B into calcium oxide in the heat storage mode.

Figure 5:
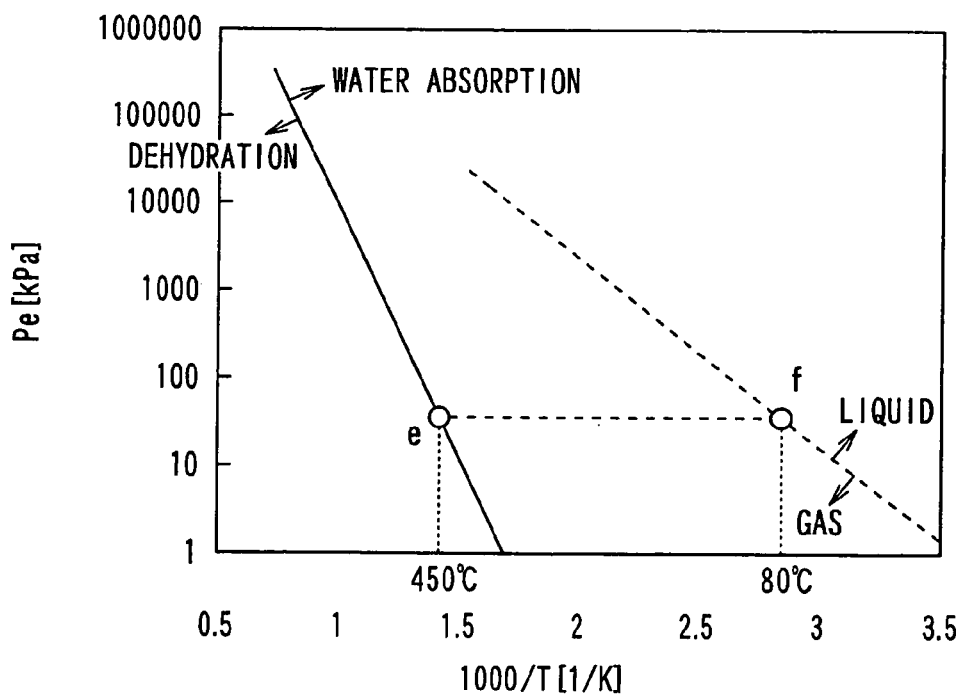
FIG. 5 is a graph showing an equilibrium line of the dehydration reaction of calcium hydroxide and a vapor-liquid equilibrium line of water in a heat storage mode according to the first embodiment.

FIG. 5 is a graph showing an equilibrium line of the dehydration reaction of calcium hydroxide and a vapor-liquid equilibrium line of water in the heat storage mode in the present embodiment. In FIG. 5, the horizontal axis indicates the reciprocal of temperature and the vertical axis indicates gas pressure. In FIG. 5, the solid line represents an equilibrium line of the dehydration reaction of calcium hydroxide and the broken line represents a vapor-liquid equilibrium line of water.

To regenerate the calcium hydroxide in the first and second reaction vessels 11A, 11B, as described above, it is necessary to heat the first and second reaction vessels 11A, 11B to 450° C. or higher. As shown in FIG. 5, when the calcium hydroxide in the first and second reaction vessels 11A, 11B is heated to 450° C. in the heat storage mode, the reaction (dehydration reaction) represented by the above Chemical Formula 2 is caused. Thus, the calcium hydroxide is separated into calcium oxide and water vapor. At this time, the pressure in the first and second reaction vessels 11A, 11B is at point e in FIG. 5.

The pressure in the condenser 3, which communicates with the first and second reaction vessels 11A, 11B through the condenser inlet passages 31A, 31B, becomes substantially equal to that in the first and second reaction vessels 11A, 11B. Therefore, when the temperature in the condenser 3 becomes 80° C. or lower as indicated by point f in FIG. 5, the water vapor is condensed and becomes water (liquid).

In the present embodiment, when the water in the first container 12A is heated at 80° C. to react with calcium oxide in the heat release mode, as shown in FIG. 5, the pressure in the first-stage heat storage unit 1A becomes substantially equal to the saturated vapor pressure Pe1 (approximately 50 kPa) at the temperature of water in the first container 12A.

Similarly, the temperature of water in the second container 12B becomes 330° C. in the heat release mode. Therefore, the pressure in the second-stage heat storage unit 1B becomes substantially equal to the saturated vapor pressure Pe2 (approximately 13 MPa) at the temperature of water in the second container 12B.

In the present embodiment, the maximum ultimate temperature Tm1 (80° C.) of the water in the first container 12A is lower than the critical temperature Tc (374° C.) of water. Therefore, the withstand pressure Pv1 of the first-stage heat storage unit 1A only has to be so set that it is higher than the saturated vapor pressure Pe1 at the maximum ultimate temperature Tm1, that is, 50 kPa.

In the present embodiment, similarly, the maximum ultimate temperature Tm2 (330° C.) of the water in the second container 12B is lower than the critical temperature Tc of water. Therefore, the withstand pressure Pv2 of the second-stage heat storage unit 1B only has to be so set that it is higher than the saturated vapor pressure Pe2 at the maximum ultimate temperature Tm2, that is, 13 MPa.

However, it is necessary to set the withstand pressure Pv of the heat storage units 1A, 1B to a value higher than atmospheric pressure, that is, 101.3 kPa, when vacuuming is carried out to bring the interior of the heat storage units 1A, 1B under vacuum before injecting water as the first reactant A during the fabrication of the heat storage units 1A, 1B. In the present embodiment, therefore, the withstand pressure Pv1 of the first-stage heat storage unit 1A is set to a value higher than 101.3 kPa.

For this reason, it is possible to make the pressure resistant structure of the first-stage heat storage unit 1A simpler than the pressure resistant structure of the second-stage heat storage unit 1B. That is, it is unnecessary to enhance the pressure resistant structures of all the heat storage units 1A, 1B and cost reduction can be achieved.

Next, the optimum filling ratio of calcium oxide filled in each heat storage unit 1A, 1B is considered.

In an ideal operating state in which there is no heat capacity in each heat storage unit 1A, 1B, the amount of heat of reaction Qr1 [J] generated in the first reaction vessel 11A can be all given to the second container 12B in the heat release mode. Therefore, the relation expressed by the following Expression 4 is satisfied:

$$Qr1 = Qo1 = Qe2 \qquad \text{(Expression 4)}$$

in which Qo1 [J] is the amount of heat transferred from the first reaction vessel 11A to the second container 12B, and Qe2 [J] is the amount of heat required for the vaporization of water in the second container 12B.

The amount of heat Qr2 [J] obtained in the second reaction vessel 11B when the water vaporized in the second container 12B reacts with the calcium oxide in the second reaction vessel 11B is expressed by the following Expression 5:

$$Qr2 = Qe2 \cdot \Delta Hr/\Delta He = Qr1 \cdot \Delta Hr/\Delta He \qquad \text{(Expression 5)}$$

in which $\Delta Hr$ [J/mol] is the heat of reaction arising from reaction between the calcium oxide and the water, and $\Delta He$ [J/mol] is the latent heat of vaporization of the water.

Therefore, in the ideal operation without heat capacity, it is desired to match a ratio of the quantity of calcium oxide filled in the first-stage heat storage unit 1A and the quantity of calcium oxide filled in the second-stage heat storage unit 1B with the ratio of ΔHr and ΔHe.

In actual operation, however, it is difficult to obtain the above-mentioned ideal operating state, and some amount of heat is lost at each part of the heat storage units 1A, 1B due to heat capacity. Therefore, the optimum filling ratio of calcium oxide varies depending on heat capacity.

The relations represented by the following Expressions 6 and 7 are established:

$$Qo1 = Qr1 - Qr1HM \quad \text{(Expression 6)}$$

$$Qr2 = \{Qe2 - Qe2HM \cdot (Ta2 - Tair)\} \cdot \Delta Hr / \Delta He \quad \text{(Expression 7)}$$

in which Qr1HM [J/K] is the heat capacity of the first reaction vessel 11A; Qe2HM [J/K] is the heat capacity of the second container 12B; Ta1 [K] is the target temperature in the first reaction vessel 11A; Ta2 [K] is the target temperature in the second reaction vessel 11B; and Tair [K] is outside air temperature.

In the present embodiment, the target temperature Ta1 in the first reaction vessel 11A is 703.15K (430° C.), the target temperature Ta2 in the second reaction vessel 11B is 603.15K (330° C.), and the outside air temperature Tair is 298.15K (25° C.).

Expression 7 is transformed into the following Expression 8 using Qe2=Qo1 of the above Expression 3.

$$Qr2 = \{Qr1 - Qr1HM \cdot (Ta1 - Tair) - Qe2HM \cdot (Ta2 - Tair)\} \cdot \Delta Hr / \Delta He \quad \text{(Expression 8)}$$

Therefore, it is desired to set the ratio of quantities of calcium oxide filled in the heat storage units 1A, 1B so that the amount of heat Qr2 satisfies the relation expressed by the following Expression 9:

$$Qr1 \cdot \Delta Hr / \Delta He < Qr2 < \{Qr1 - Qr1HM \cdot (Ta1 - Tair) - Qe2HM \cdot (Ta2 - Tair)\} \cdot \Delta Hr / \cdot He \quad \text{(Expression 9)}$$

In the present embodiment, calcium oxide is used for the second reactant B as a chemical thermal storage medium. However, it is possible to use metal oxide, such as magnesium oxide (MgO), manganese oxide (MnO), copper(II) oxide (CuO), and aluminum oxide ($Al_2O_3$), as the chemical thermal storage medium.

Figure 6:
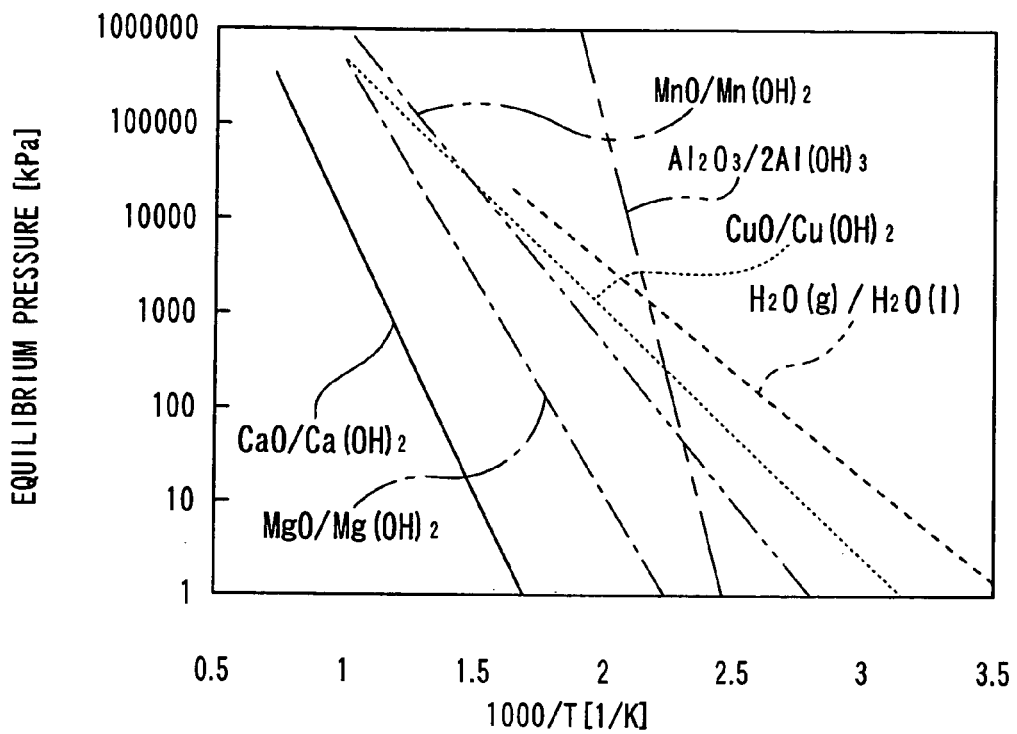
FIG. 6 is a graph showing an equilibrium line of the water absorption reaction of metal oxides and a vapor-liquid equilibrium line of water.

FIG. 6 is a graph showing equilibrium lines of the water absorption reaction of the above metal oxides and a vapor-liquid equilibrium line of water. In FIG. 6, the horizontal axis indicates the reciprocal of temperature and the vertical axis indicates equilibrium pressure.

In FIG. 6, of the equilibrium lines of the water absorption reactions of the multiple metal oxides, the equilibrium line of the water absorption reaction of calcium oxide is the farthest from the vapor-liquid equilibrium line of water. As shown in FIG. 3, therefore, the temperature can be raised to a desired temperature (770° C.) by just providing two stages of the heat storage units 1A, 1B.

Figure 7:
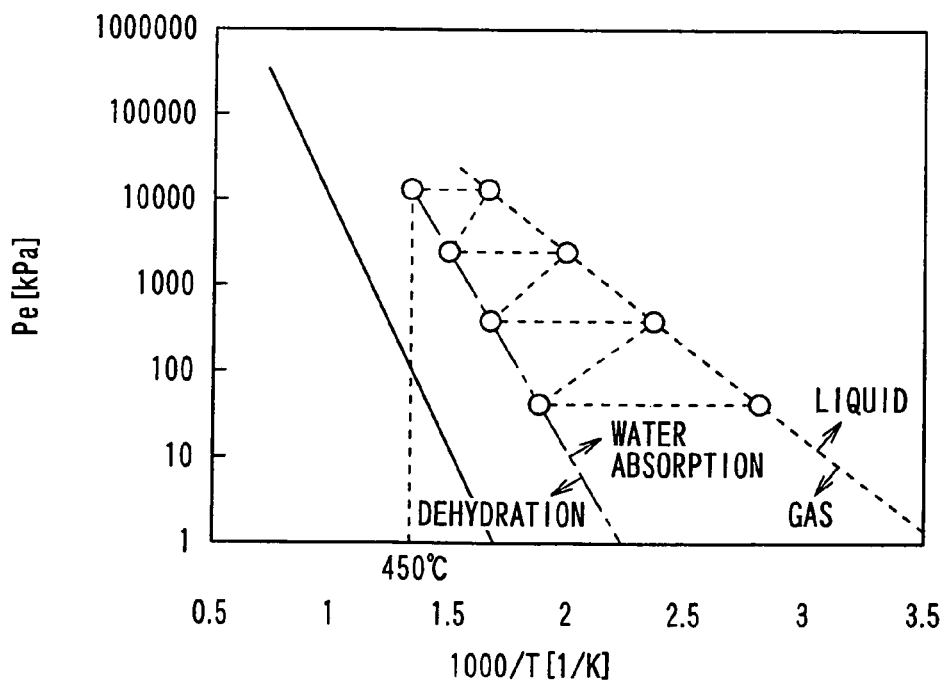
FIG. 7 is a graph showing an equilibrium line of the water absorption reaction of magnesium oxide and a vapor-liquid equilibrium line of water.

Meanwhile, of the equilibrium lines of the water absorption reactions of the multiple metal oxides, the equilibrium line of magnesium oxide is the farthest from the vapor-liquid equilibrium line of water next to that of calcium oxide. FIG. 7 is a graph showing the equilibrium line of the water absorption reaction of magnesium oxide and the vapor-liquid equilibrium line of water. In FIG. 7, the horizontal axis indicates the reciprocal of temperature and the vertical axis indicates gas pressure.

When magnesium oxide is used as the chemical thermal storage medium, as shown in FIG. 7, the temperature can only be raised to about 450° C. even by lining heat storage units in four stages. In such a case, because the number of stages of heat storage units is increased, the efficiency of utilization of heat is degraded. Therefore, by using the calcium oxide as the chemical thermal storage medium as in the present embodiment, the number of stages of heat storage units is minimized to reduce manufacturing costs and further output temperature is securely increased.

According to the present embodiment, in the heat release mode, the heat of reaction generated in the first reaction vessel 11A of the first-stage heat storage unit 1A is transmitted to the second container 12B of the second-stage heat storage unit 1B. The water heated and vaporized by this heat flows into the second reaction vessel 11B of the second-stage heat storage unit 1B and reacts with the calcium oxide to generate, heat of reaction again. The second reaction vessel 11B of the second-stage heat storage unit 1B, that is, the heat storage unit in the last stage is thermally connected with the heat engine 6. Therefore, heat whose temperature (770° C.) has been made higher than that of solar heat as external heat can be utilized at the heat engine 6.

In the heat release mode, as described above, output can be extracted as long as there is heat from the heat accumulator 4 that feeds heat lower in temperature (80° C.) than solar heat. That is, heat higher in temperature than solar heat can be outputted even without the presence of the solar heat as external heat during heat release.

(Second Embodiment)

A second embodiment will be described hereinafter with reference to FIG. 8. The second embodiment is different from the first embodiment in that the condenser inlet passages and the condenser outlet passage are eliminated and, instead, heat of the water vapor produced in the first and second reaction vessels 11A, 11B is exchanged with outside air through refrigerant.

Figure 8:
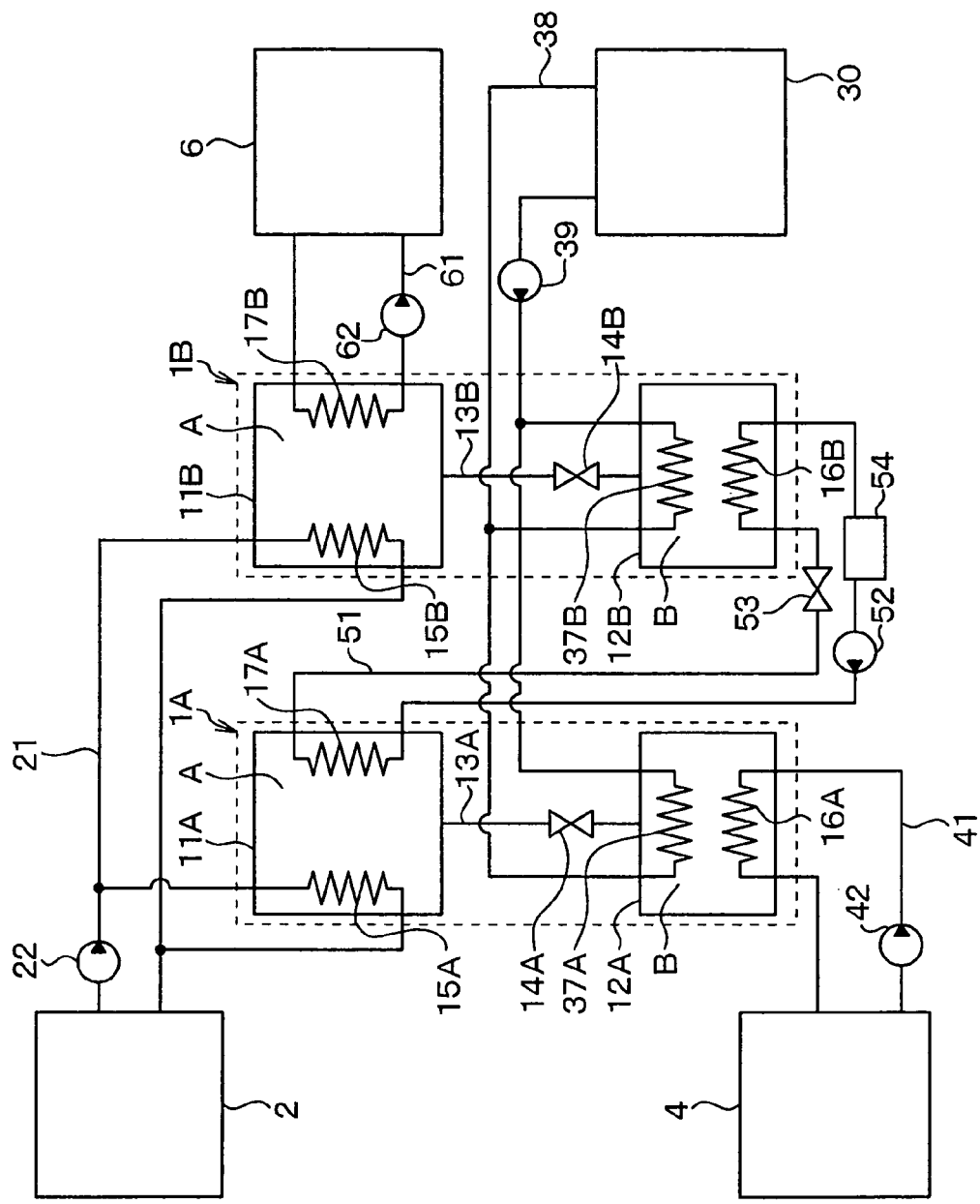
FIG. 8 is an overall block diagram illustrating a chemical heat accumulator according to a second embodiment of the present invention.

FIG. 8 is an overall block diagram illustrating a chemical heat accumulator according to the second embodiment. As illustrated in FIG. 8, the chemical heat accumulator f the present embodiment is so configured that, in the heat storage mode, the water vapor produced in the first and second reaction vessels 11A, 11B flows into the first and second containers 12A, 12B through the connection passages 13A, 13B.

The chemical heat accumulator of the present embodiment includes: condensing heat exchangers 37A, 37B placed in the first and second containers 12A, 12B; a refrigerant refrigerator 30 placed outside the heat storage units 1A, 1B; and a refrigerant circuit 38 that circulates refrigerant between the condensing heat exchangers 37A, 37B and the refrigerant refrigerator 30.

The condensing heat exchangers 37A, 37B are heat exchangers that perform heat exchange between vapor and the refrigerant to cool and condense water vapor in the heat storage mode. The refrigerant refrigerator 30 is a heat exchanger that performs heat exchange between the refrigerant and outside air to cool the refrigerant. In the refrigerant circuit 38, there is placed a refrigerant pump 39 for circulating the refrigerant.

Next, an operation of the present embodiment will be described. In the heat storage more, the water vapor introduced into the first and second containers 12A, 12B through the connection passages 13A, 13B is cooled and condensed at the condensing heat exchangers 37A, 37B, and retained in the first and second containers 12A, 12B. The refrigerant that absorbed heat from water vapor at the condensing heat exchangers 37A, 37B flows into the refrigerant refrigerator 30 through the refrigerant circuit 38. The refrigerant introduced into the refrigerant refrigerator 30 exchanges heat with outside air and is thereby cooled.

According to the present embodiment, the water vapor produced in the first and second reaction vessels 11A, 11B can be condensed in the first and second containers 12A, 12A. Therefore, the advantages similar to the first embodiment are achieved without employing a passage and a water pump for returning water condensed by a condensing means to the first and second containers 12A, 12B.

(Third Embodiment)

A third embodiment will be described with reference to FIG. 9. The third embodiment is different from the first embodiment in that part of heat of reaction generated in the first reaction vessel 11A is used as a heating source for heating water housed in the first container 12A.

Figure 9:
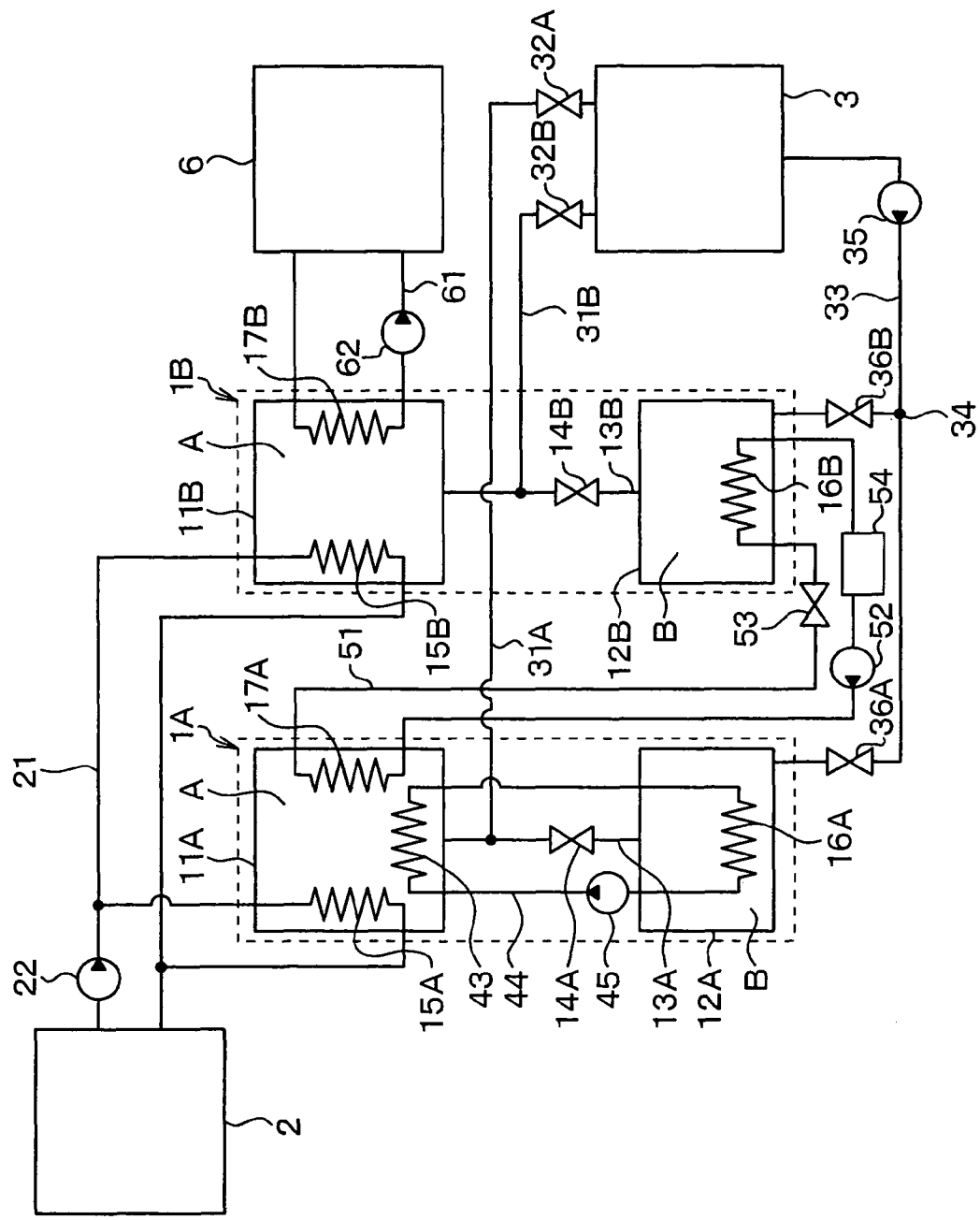
FIG. 9 is an overall block diagram of a chemical heat accumulator according to a third embodiment of the present invention.

FIG. 9 is an overall block diagram illustrating a chemical heat accumulator of the third embodiment. As illustrated in FIG. 9, the chemical heat accumulator of the present embodiment includes: a heat sourcing heat exchanger 43 placed in the first reaction vessel 11A; the first water heating heat exchanger 16A placed in the first container 12A; and a fifth heating medium circuit 44 that circulates a fifth heating medium between the heat sourcing heat exchanger 43 and the first water heating heat exchanger 16A.

The heat sourcing heat exchanger 43 is a heat exchanger that heats the fifth heating medium by heat of reaction generated when calcium oxide and water react with each other in the first reaction vessel 11A. The first water heating heat exchanger 16A is a heat exchanger that performs heat exchange between the fifth heating medium and the water housed in the first container 12A to heat and vaporize the water. In the fifth heating medium circuit 44, there is placed a fifth heating medium pump 45 that circulates the fifth heating medium.

Next, an operation of the present embodiment will be described. In the heat release mode, heat of reaction generated when the calcium oxide and the water react with each other in the first reaction vessel 11A is transmitted to the water in the first container 12A through the fifth heating medium. As a result, the water is heated and vaporized. The water vapor produced in the first container 12 flows into the first reaction vessel 11A through the connection passage 13A and reacts with the calcium oxide. As a result, heat of reaction is generated.

According to the present embodiment, the water housed in the first container 12A can be heated by part of the heat of reaction generated in the first reaction vessel 11A. Therefore, it is unnecessary to separately provide a heating source and thus the similar advantages as the first embodiment can be obtained through a simple configuration. In the heat release mode, an external heating source is not required at all. Therefore, the chemical heat accumulator of the present embodiment can be applied to a wide range of systems.

(Fourth Embodiment)

A fourth embodiment will be described with reference to FIG. 10. The fourth embodiment is different from the first embodiment in that heat present in the second container 12B is used as a heating source for heating the water housed in the first container 12A.

Figure 10:
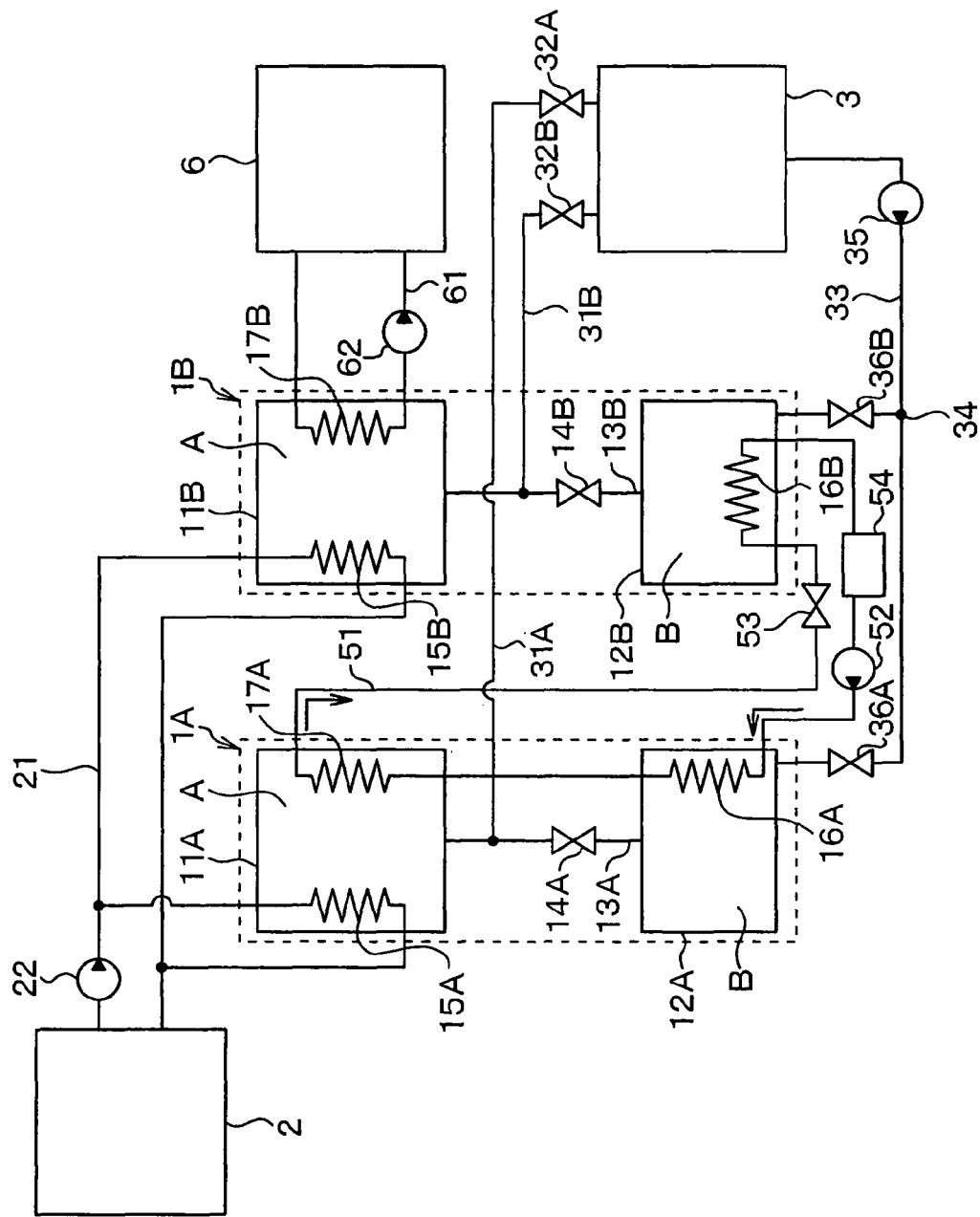
FIG. 10 is an overall block diagram illustrating a chemical heat accumulator according to a fourth embodiment of the present invention.

FIG. 10 is an overall block diagram illustrating a chemical heat accumulator of the fourth embodiment. As illustrated in FIG. 10, the heat-of-reaction transporting circuit 51 in the present embodiment is so configured as to circulate the third heating medium from the first heat recovering heat exchanger 17A to the second water heating heat exchanger 16B to the first water heating heat exchanger 16A. The first water heating heat exchanger 16A is placed between the outlet of the third heating medium pump 52 and the inlet of the first heat recovering heat exchanger 17A.

Next, an operation of the present embodiment will be described. In the heat release mode, the third heating medium circulating in the heat-of-reaction transporting circuit 51 absorbs heat of reaction generated in the first reaction vessel 11A at the first heat recovering heat exchanger 17A. At the second water heating heat exchanger 16B, thereafter, part of the amount of heat absorbed at the first heat recovering heat exchanger 17A is released to the water in the second container 12B.

At the first water heating heat exchanger 16A, thereafter, the amount of heat is released to the water in the first container 12A. This amount of heat is equivalent to the value obtained by subtracting the amount of heat released at the second water heating heat exchanger 16B from the amount of heat absorbed at the first heat recovering heat exchanger 17A. Thus the water in the first container 12A is heated and vaporized and this water vapor flows into the first reaction vessel 11A through the connection passage 13A and reacts with calcium oxide. As a result, heat of reaction is generated.

According to the present embodiment, the water housed in the first container 12A can be heated by part of heat transmitted to the second container 12B. Therefore, it is unnecessary to separately provide a heating source and thus the similar advantages as the first embodiment can be obtained through a simple configuration. In the heat release mode, an external heating source is not required at all. Therefore, the chemical heat accumulator of the present embodiment can be applied to a wide range of systems.

(Fifth Embodiment)

A fifth embodiment will be described with reference to FIG. 11. The fifth embodiment is different from the first embodiment in that heat of condensation generated when the water vapor is condensed in the condenser 3 is used as a heating source for heating the water housed in the first container 12A.

Figure 11:
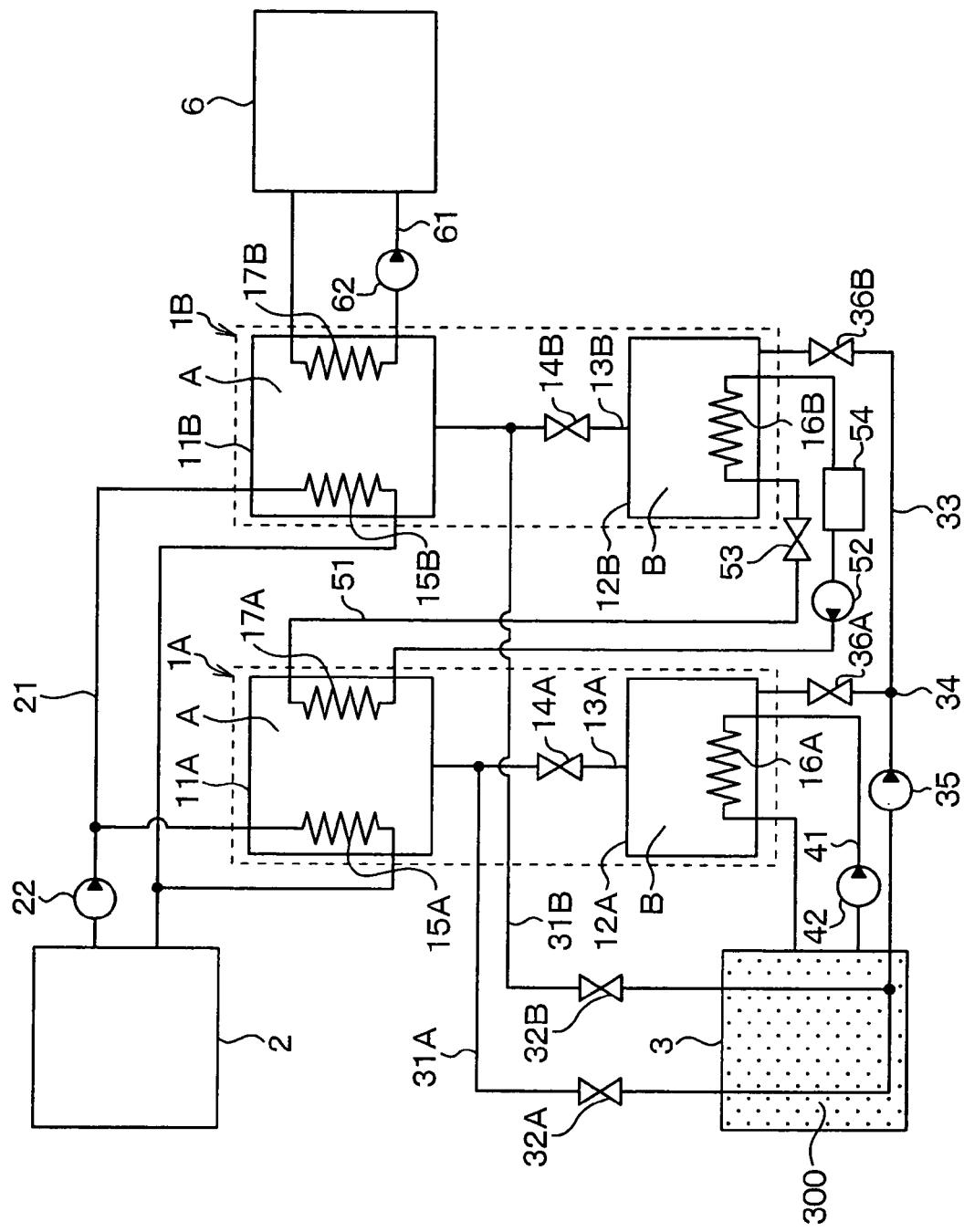
FIG. 11 is an overall block diagram illustrating a chemical heat accumulator according to a fifth embodiment of the present invention.

FIG. 11 is an overall block diagram illustrating a chemical heat accumulator of the fifth embodiment. As illustrated in FIG. 11, the condenser 3 of the present embodiment includes a thermal storage medium 300 that stores heat of condensation generated when the water vapor produced in the first and second reaction vessels 11A, 11B is condensed. The first water heating heat exchanger 16A is connected with the condenser 3 through the second heating medium circuit 41. Therefore, the water in the first container 12A can be heated by heat stored in the thermal storage medium 300 in the condenser 3 through the first water heating heat exchanger 16A. That is, the condenser 3 of the present embodiment provides the heating source.

According to the present embodiment, the water housed in the first container 12A can be heated by heat of condensation generated when water vapor produced in the first and second reaction vessels 11A, 11B is condensed. Therefore, the similar advantages as the first embodiment can be obtained through such a simple configuration that the condenser 3 is just provided with the thermal storage medium 300. Since the heat of condensation discharged into outside air in the first embodiment can be effectively utilized as a heating source, the efficiency of utilization of heat can be enhanced.

(Sixth Embodiment)

A sixth embodiment will be described with reference to FIG. 12. The sixth embodiment is different from the fifth embodiment in that the light and heat collecting device 2 and the thermal storage medium 300 as the heating source are thermally connected with each other so that the heat of the light and heat collecting device 2 can be stored in the thermal storage medium 300.

Figure 12:
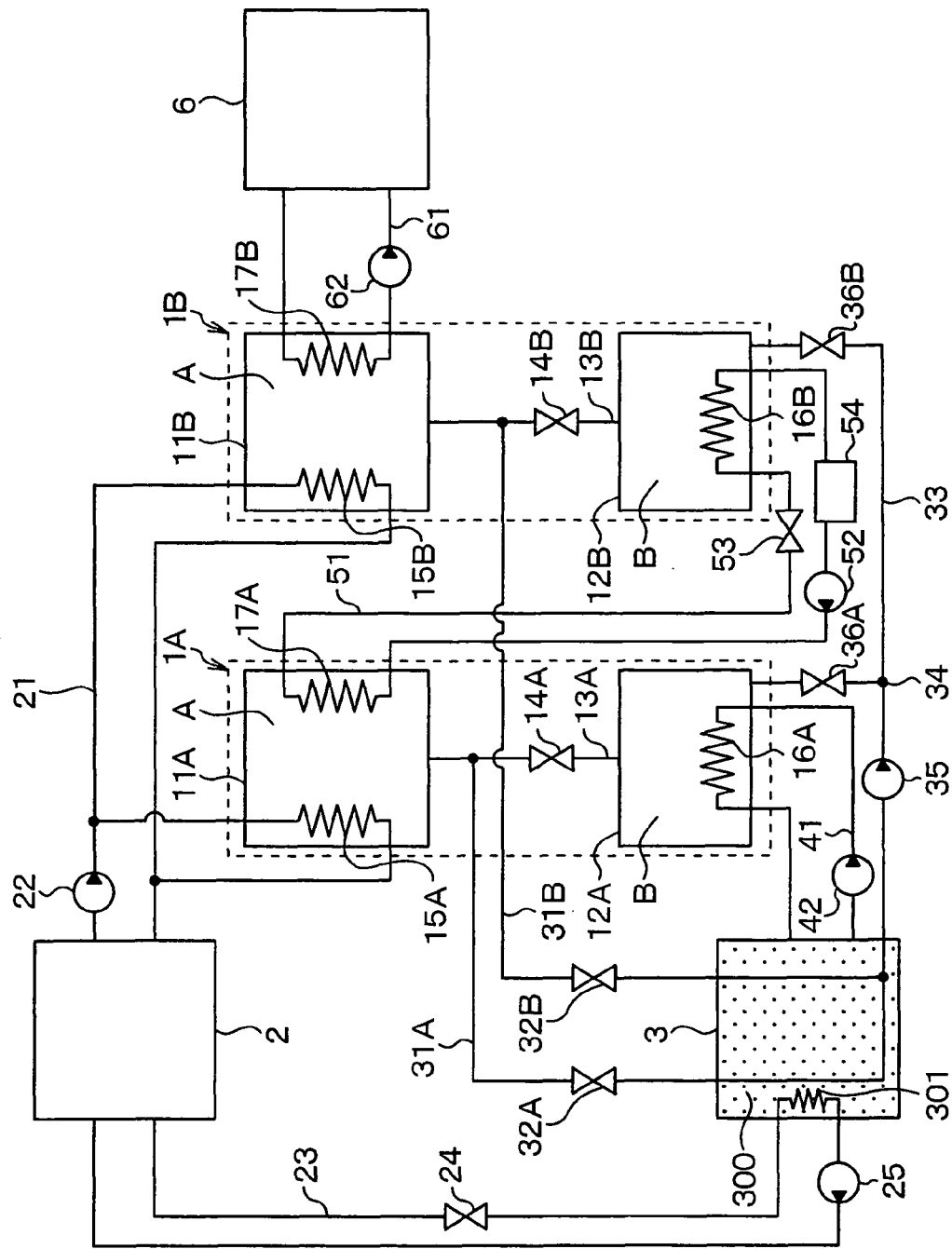
FIG. 12 is an overall block diagram illustrating a chemical heat accumulator according to a sixth embodiment of the present invention.

FIG. 12 is an overall block diagram illustrating a chemical heat accumulator of the sixth embodiment. As illustrated in FIG. 12, the chemical heat accumulator of the present embodiment includes: a heat storing heat exchanger 301 thermally connected to the condenser 3; and a sixth heating medium circuit 23 that circulates a sixth heating medium between the heat storing heat exchanger 301 and the light and heat collecting device 2. The heat storing heat exchanger 301 is a heat exchanger that performs heat exchange between the sixth heating medium heated at the light and heat collecting device 2 and the thermal storage medium 300. It thereby gives heat present in the sixth heating medium to the thermal storage medium 300.

A sixth on-off valve 24 is placed between the outlet of the light and heat collecting device 2 and the inlet of the heat storing heat exchanger 301 in the sixth heating medium circuit 23. The sixth on-off valve 24 opens and closes the sixth heating medium circuit 23. A sixth heating medium pump 25 is placed between the outlet of the heat storing heat exchanger 301 and the inlet of the light and heat collecting device 2 in the sixth heating medium circuit 23. The sixth heating medium pump 25 circulates the sixth heating medium in the sixth heating medium circuit 23.

According to the present embodiment, when solar heat collected at the light and heat collecting device 2 is redundant, the sixth on-off valve 24 is opened and the sixth heating medium pump 25 is operated, so that the solar heat collected at the light and heat collecting device 2 is stored in the thermal storage medium 300 through the sixth heating medium. Therefore, the solar heat collected at the light and heat collecting device 2 can be effectively utilized to enhance the efficiency of utilization of heat.

(Seventh Embodiment)

A seventh embodiment will be described with reference to FIG. 13. The seventh embodiment is different from the first embodiment in that the object to be heated is a high-temperature part of a Stirling engine.

Figure 13:
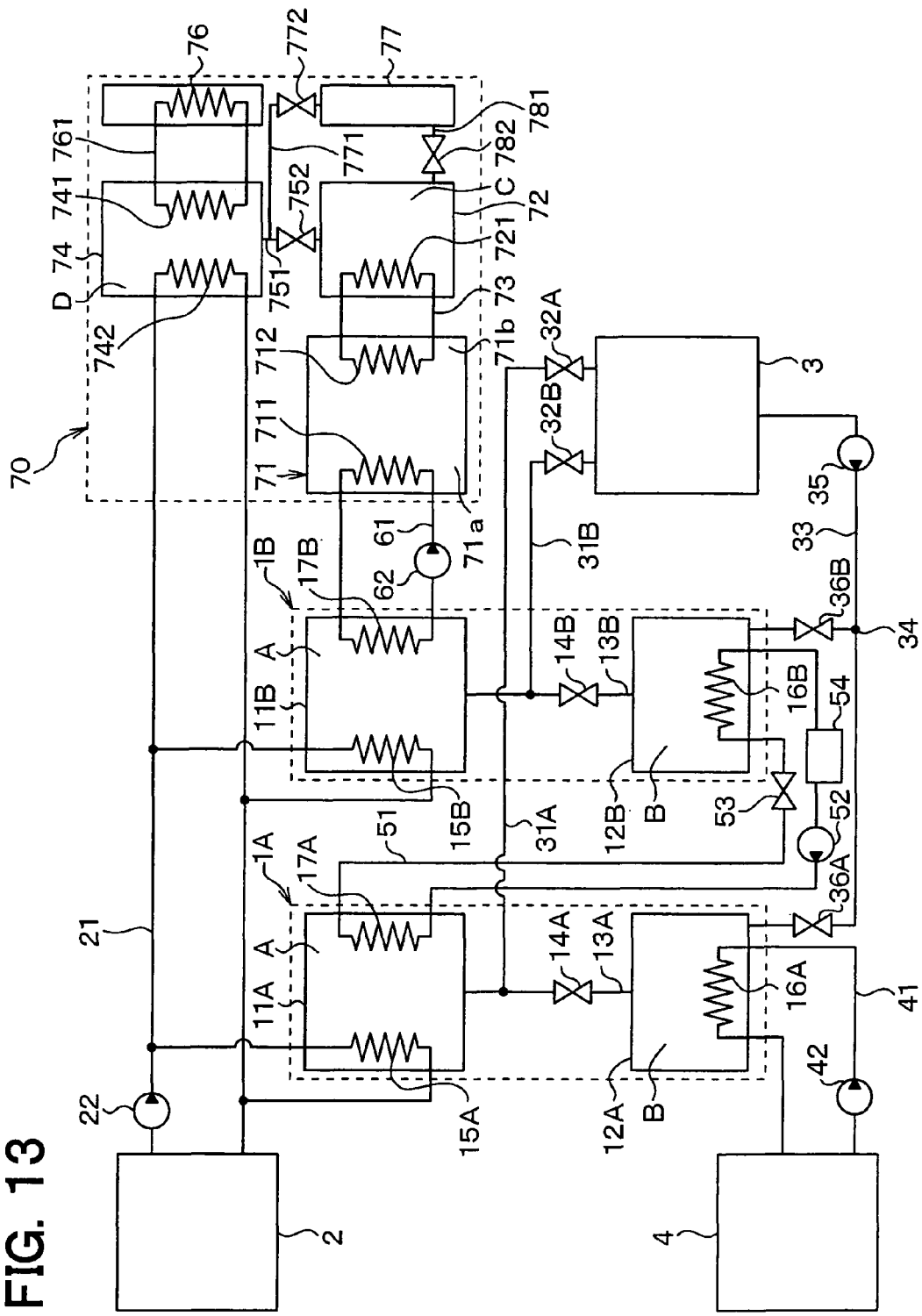
FIG. 13 is an overall block diagram illustrating a chemical heat accumulator according to a seventh embodiment of the present invention.

FIG. 13 is an overall block diagram illustrating a chemical heat accumulator of the seventh embodiment. As illustrated in FIG. 13, the chemical heat accumulator of the present embodiment is connected with a heat utilizing device 70 that utilizes heat stored in the chemical heat accumulator. This heat utilizing device 70 includes a Stirling engine 71 as a heat engine that converts heat energy into mechanical energy. The Stirling engine 71 includes a high-temperature part 71a for heating and expanding working gas and a low-temperature part 71b for cooling and contracting working gas.

The high-temperature part 71a of the Stirling engine 71 is provided with a high-temperature part heat exchanger 711. The high-temperature part heat exchanger 711 is connected to the heat output circuit 61 and performs heat exchange between the fourth heating medium heated at the second heat recovering heat exchanger 17B and working gas to thereby heat the working gas.

The low-temperature part 71b of the Stirling engine 71 is thermally connected with a third reactant housing part 72 that houses third reactant C in a liquid state. Specifically, the heat utilizing device 70 includes: a low-temperature part heat exchanger 712 placed in the low-temperature part 71b of the Stirling engine 71; a third reactant heat exchanger 721 placed in the third reactant housing part 72; and a seventh heating medium circuit 73 that circulates a seventh heating medium between the low-temperature part heat exchanger 712 and the third reactant heat exchanger 721.

The low-temperature part heat exchanger 712 is a heat exchanger that performs heat exchange between working gas and the seventh heating medium to thereby cool the working gas. The third reactant heat exchanger 721 is a heat exchanger that performs heat exchange between the seventh heating medium and the third reactant C to thereby release heat, absorbed by the seventh heating medium at the low-temperature part heat exchanger 712, into the third reactant C. As a result, the third reactant C is heated and vaporized by the seventh heating medium.

The third reactant housing part 72 is connected with a third reactant passage 751 that guides the third reactant C vaporized at the third reactant housing part 72 to a fourth reactant housing part 74 housing fourth reactant D in a solid state. In the third reactant passage 751, there is placed a third reactant passage on-off valve 752 that opens and closes the third reactant passage 751.

In the present embodiment, water is used as the third reactant C and calcium oxide is used as the fourth reactant D. In the fourth reactant housing part 74, as a result, the chemical reaction represented by the above described Chemical Formula 1 occurs and heat of reaction is generated during this reaction.

In the fourth reactant housing part 74, there is placed a heat releasing heat exchanger 741 for releasing heat of reaction generated at the fourth reactant housing part 74 during the above reaction. Specifically, the heat releasing heat exchanger 741 is a heat exchanger that releases the heat of reaction into a heat releasing heating medium.

The heat releasing heat exchanger 741 is connected with a heat releasing heating medium circuit 761 for circulating the heat releasing heating medium. In the heat releasing heating medium circuit 761, a heating medium cooling heat exchanger 76 is placed. The heating medium cooling heat exchanger 76 performs heat exchange between the heat releasing heating medium that absorbed heat of reaction at the heat releasing heat exchanger 741 and outside air to cool the heat releasing heating medium.

In the fourth reactant housing part 74, there is placed a regeneration heat exchanger 742 for heating calcium hydroxide produced during the chemical reaction represented by Chemical Formula 1 above to separate the calcium hydroxide into calcium oxide and water. The regeneration heat exchanger 742 is connected to the first heating medium circuit 21 and the calcium hydroxide in the fourth reactant housing part 74 is heated by the first heating medium heated by solar heat at the light and heat collecting device 2.

The fourth reactant housing part 74 is connected with a condensation passage 771 that guides water (water vapor) separated from the calcium hydroxide into a condensing heat exchanger 77. In the condensation passage 771, there is placed a condensation passage on-off valve 772 that opens and closes the condensation passage 771.

The condensing heat exchanger 77 is a heat exchanger that performs heat exchange between the water vapor separated from the calcium hydroxide and outside air to cool and condense the water, vapor. The condensing heat exchanger 77 is so configured that water condensed at the condensing heat exchanger 77 is retained therein.

The condensing heat exchanger 77 is connected with a reflux passage 781 that guides the water retained in the condensing heat exchanger 77 to the third reactant housing part 72. In the reflux passage 781, there is placed a reflux passage on-off valve 782 that opens and closes the reflux passage 781.

An operation of the present embodiment having the above configuration will be described hereinafter with reference to FIG. 13. First, an operation in the heat release mode will be described.

In the heat release mode, the fourth heating medium that was heated in the chemical heat accumulator is fed to the high-temperature part heat exchanger 711 and the high-temperature part 71a of the Stirling engine 71 is heated. The third reactant passage on-off valve 752 is fully opened and the condensation passage on-off valve 772 and the reflux passage on-off valve 782 are fully closed. Further, the fourth reactant housing part 74 is cooled by the heat releasing heating medium. Therefore, the water in the third reactant housing part 72 flows into the fourth reactant housing part 74 through the third reactant passage 751 and the chemical reaction represented by Chemical Formula 1 above occurs.

At the third reactant heat exchanger 721, at this time, the seventh heating medium is cooled by heat of vaporization generated when the water in the third reactant housing part 72 is vaporized and its temperature becomes lower than that of outside air. As a result, the low-temperature part 71b of the Stirling engine 71 is cooled by the seventh heating medium lower in temperature than outside air at the low-temperature part heat exchanger 712.

Accordingly, in the heat release mode, since the high-temperature part 71a of the Stirling engine 71 can be heated to about 770° C. and the low-temperature part 71b is cooled to a temperature lower than that of outside air. Therefore, heat energy can be efficiently converted into mechanical energy.

Next, an operation in the heat storage mode will be described. In the heat storage mode, the third reactant passage on-off valve 752 and the reflux passage on-off valve 782 are fully closed; the condensation passage on-off valve 772 is fully opened; and the first heating medium pump 22 is actuated. Therefore, the calcium hydroxide in the fourth reactant housing part 74 is heated by the first heating medium heated by solar heat at the regeneration heat exchanger 742, and thus is separated into calcium oxide and water vapor. This water vapor flows into the condensing heat exchanger 77 through the condensation passage 771 and is then cooled and condensed by outside air at the condensing heat exchanger 77.

Next, an operation in the heat storage sustainment mode will be described. In the heat storage sustainment mode, the condensation passage on-off valve 772 is also fully closed. As a result, solar heat can be stored.

By fully opening the reflux passage on-off valve 782 at this time, the water retained in the condensing heat exchanger 77 can be returned to the third reactant housing part 72 through the reflux passage 781. After the water retained in the condensing heat exchanger 77 is all returned to the third reactant housing part 72, the reflux passage on-off valve 782 is fully closed.

The above-mentioned step of returning the water retained in the condensing heat exchanger 77 to the third reactant housing part 72 may be carried out not only in the heat storage sustainment mode but also in the heat release mode and the heat storage mode.

According to the present embodiment, the advantages similar to the first embodiment can be achieved, and further the heat energy can be efficiently converted into mechanical energy.

(Eighth Embodiment)

An eighth embodiment will be described hereinafter with reference to FIG. 14. The eighth embodiment is different from the first embodiment in the heating temperature of the first container 12A in the heat release mode.

Figure 14:
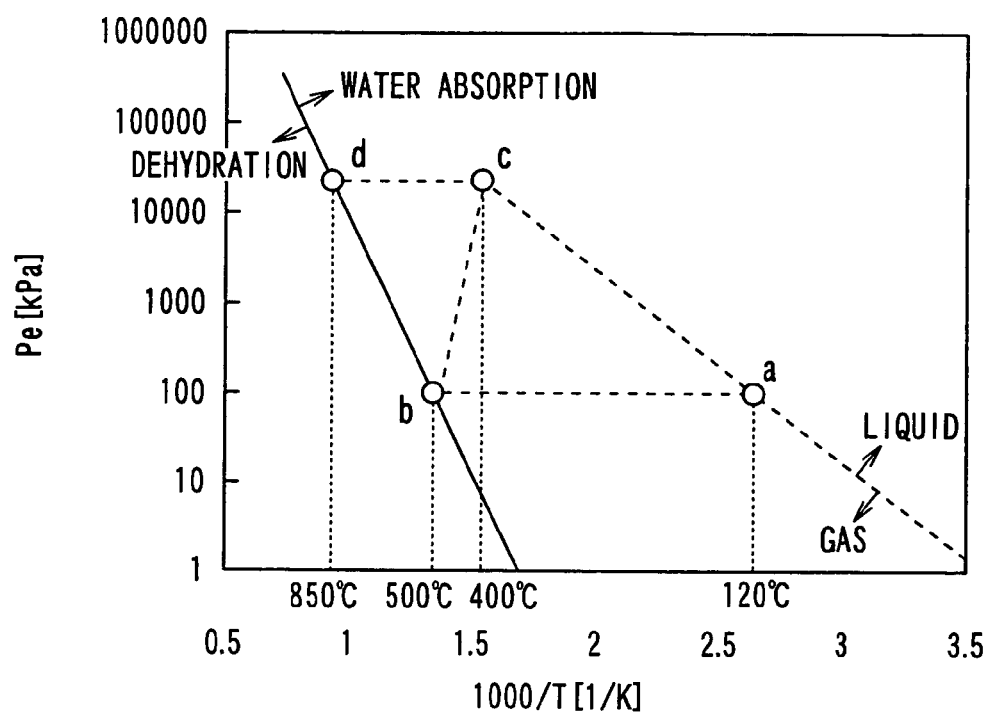
FIG. 14 is a graph showing an equilibrium line of the water absorption reaction of a calcium oxide and a vapor-liquid equilibrium line of water in a heat release mode in a chemical heat accumulator according to an eighth embodiment of the present invention.

FIG. 14 is a graph showing an equilibrium line of the water absorption reaction of calcium oxide and a vapor-liquid equilibrium line of water in the heat release mode in the eighth embodiment. In FIG. 14, the horizontal axis indicates the reciprocal of temperature and the vertical axis indicates gas pressure. In FIG. 14, the solid line represents the equilibrium line of the water absorption reaction of calcium oxide, and the broken line represents the vapor-liquid equilibrium line of water.

As shown in FIG. 14, when the water in the first container 12A is heated to 120° C. in the heat release mode, the pressure in the first container 12A reaches approximately 200 kPa, as shown by point a. Thus, the pressure in the first reaction vessel 11A communicating with the first container 12A through the connection passage 13A becomes substantially equal to the pressure in the first container 12A. As such, the temperature of calcium oxide in the first reaction vessel 11A rises to about 500° C. as shown by point b in FIG. 14 in conjunction with the reaction (water absorption reaction) represented by Chemical Formula 1 above.

Heat generated in the first reaction vessel 11A is transmitted to water in the second container 12B through the third heating medium. At this time, a temperature difference of about 100° C. is produced between the first reaction vessel 11A and the second container 12B in accordance with the heat transmission. Therefore, the temperature of water in the second container 12B becomes about 400° C. At the time, the pressure in the second reaction vessel 11B communicating with the second container 12B through the connection passage 13B becomes substantially equal to the pressure in the second container 12B. Therefore, the temperature of calcium oxide in the second reaction vessel 11B rises to about 850° C. as shown by point d in FIG. 14 in conjunction with the reaction (water absorption reaction) represented by Chemical Formula 1 above.

In the present embodiment, the maximum ultimate temperature Tm2 (point c in FIG. 14) of water, in the second container 12B is higher than the critical temperature Tc (374° C.) of water. Therefore, the pressure resistant structure of the second-stage heat storage unit 1B cannot be made identical with the pressure resistant structure of that in the first embodiment.

The pressure Paq of water in the second container 12B is expressed by the following Expression 10, where n is the molecular weight [mol] of water in the second container 12B; Vm is the volumetric capacity [m$^3$] of the second container 12B; z is a compressibility factor; and R is a gas constant (R=8.314 [J/(molK)]).

$$Paq = znRTm2/Vm \quad \text{(Expression 10)}$$

Therefore, to maintain the structure of the heat storage unit 1B, it is necessary to make the withstand pressure Pv2 [Pa] of the second-stage heat storage unit 1B larger than Paq. That is, it is necessary to set the withstand pressure Pv2 of the second-stage heat storage unit 1B to satisfy the relation expressed by the following Expression 11:

$$Pv2 > znRTm2/Vm \quad \text{(Expression 11)}$$

When the maximum ultimate temperature Tm2 of water in the second container 12B of the second-stage heat storage unit 1B is equal to or higher than the critical temperature Tc of water as in the present embodiment, the withstand pressure Pv of the second-stage heat storage unit 1B is so set that the relation expressed by the above Expression 11 is satisfied.

(Ninth Embodiment)

A ninth embodiment will be described with reference to FIG. 15. The ninth embodiment is different from the seventh embodiment in that: heat of reaction generated when calcium oxide and water react with each other at the fourth reactant housing part 74 is used as a heating source for heating water housed in the first container 12A.

Figure 15:
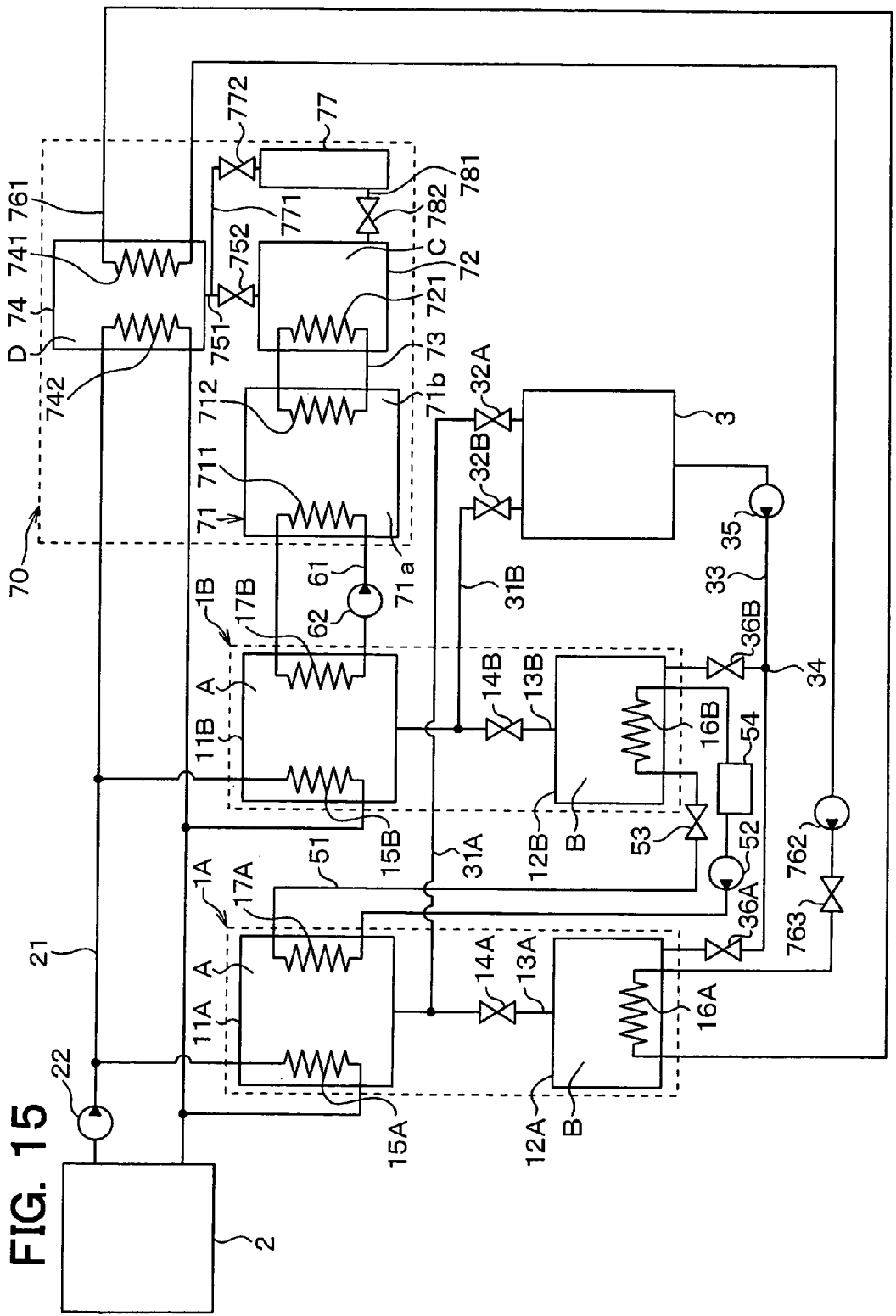
FIG. 15 is an overall block diagram illustrating a chemical heat accumulator according to a ninth embodiment of the present invention.

FIG. 15 is an overall, block diagram of a chemical heat accumulator according to the ninth embodiment. As illustrated in FIG. 15, the chemical heat accumulator according to the present embodiment includes a heat releasing heating medium circuit 761 for circulating a heat releasing heating medium between the heat releasing heat exchanger 741 and the first water heating heat exchanger 16A. Therefore, in the heat release mode, heat of reaction generated when the calcium oxide and the water react with each other at the fourth reactant housing part 74 is absorbed to the heat releasing heating medium at the heat releasing heat exchanger 741, and the heat of reaction is released to the water in the first container 12A at the first water heating heat exchanger 16A to heat the water.

In the heat releasing heating medium circuit 761, a heat releasing heating medium pump 762 for circulating the heat releasing heating medium, and a heat releasing heating medium circuit on-off valve 762 that, opens and closes the heat releasing heating medium circuit 761 are placed.

According to the present embodiment, the water housed in the first container 12A can be heated by the heat of reaction generated at the fourth reactant housing part 74. Therefore, it is unnecessary to separately provide a heating source and the effect of the seventh embodiment can be obtained through a simple configuration. In the heat release mode, an external heating source is not required at all and the chemical heat accumulator of the present embodiment can be applied to a wide range of systems.

In the seventh embodiment, the heat of reaction generated at the fourth reactant housing part 74 is discharged to outside air. In the present embodiment, on the other hand, the heat of reaction can be effectively utilized as a heating source. Accordingly, the efficiency of utilization of heat can be enhanced.

(Tenth Embodiment)

A tenth embodiment will be described with reference to FIGS. 16 and 17. The tenth embodiment is different from the first embodiment in that the regeneration heat exchanger and the heat recovering heat exchanger placed in each of the first and second reaction vessels 11A, 11B are configured as a single heat exchanger, and a heating medium circuit through which a heating medium fed to the single heat exchanger is switched by an electric three-way valve.

Figure 16:
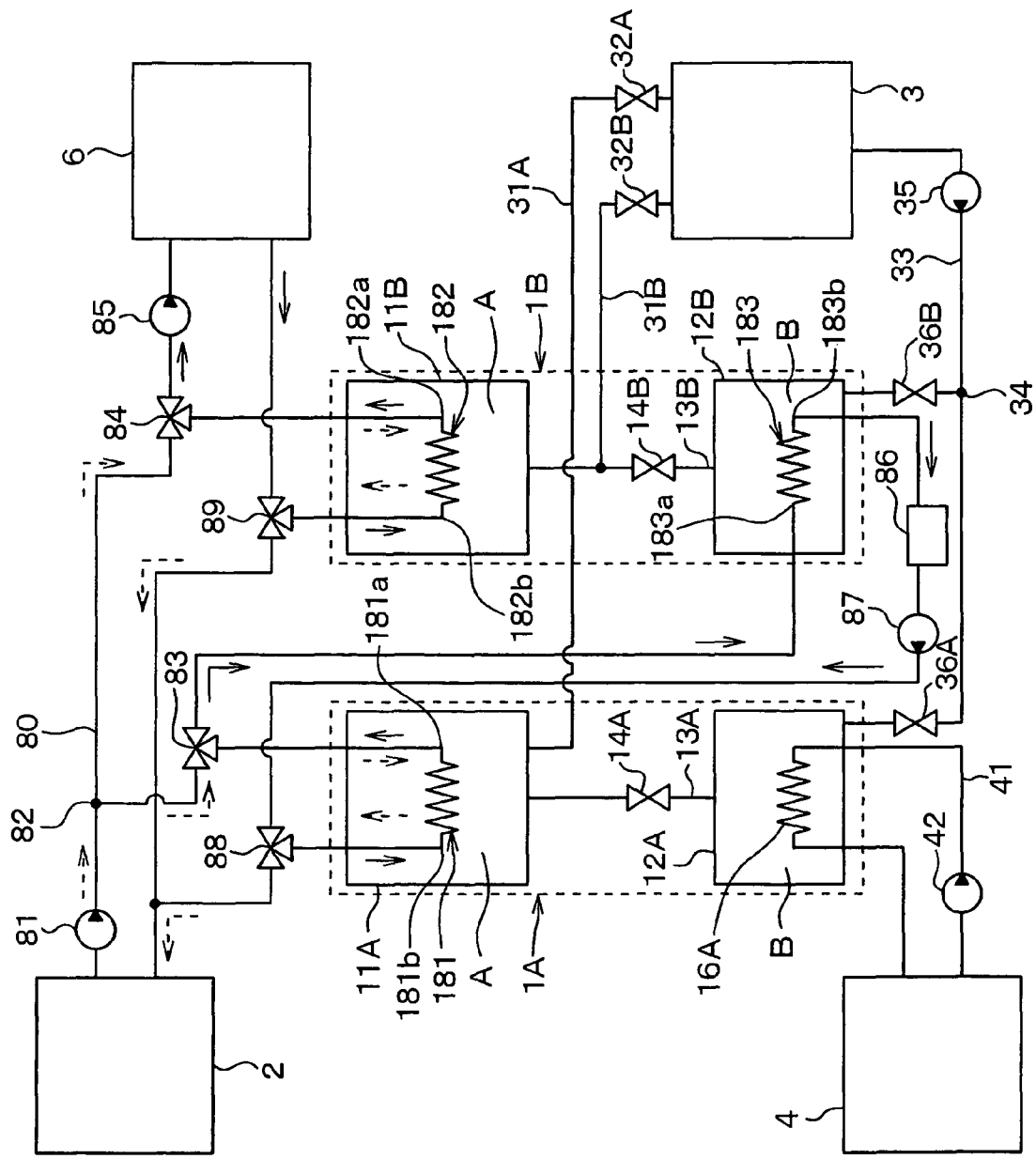
FIG. 16 is an overall block diagram illustrating a chemical heat accumulator according to a tenth embodiment of the present invention.
Figure 17:
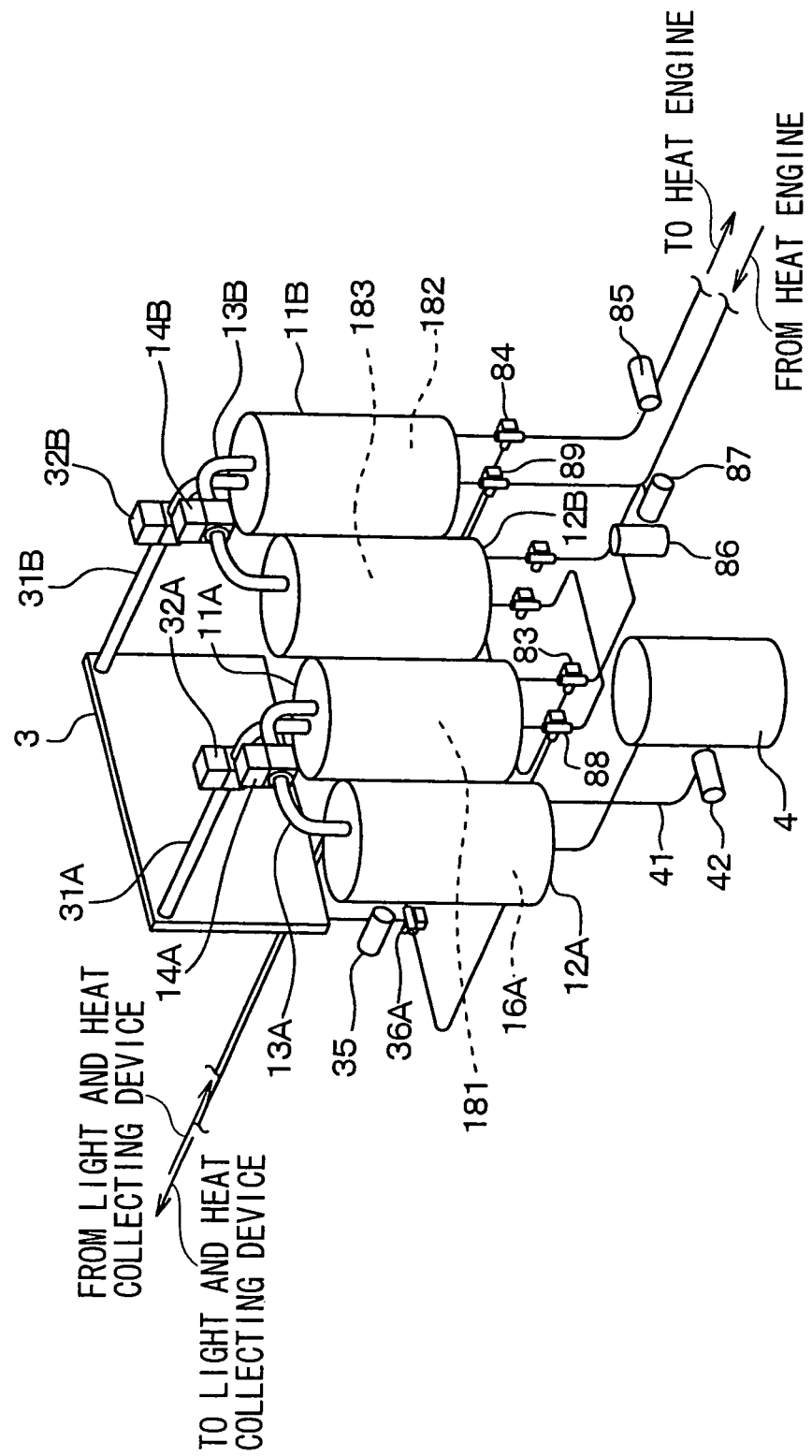
FIG. 17 is a perspective view illustrating a chemical heat accumulator according to the tenth embodiment.

FIG. 16 is an overall block diagram illustrating a chemical heat accumulator according to the tenth embodiment and FIG. 17 is a perspective view illustrating a chemical heat accumulator according to the tenth embodiment.

The first reaction vessel 11A is provided therein with a first heat exchanger 181 that performs heat exchange between a substance (e.g., calcium oxide or calcium hydroxide) in the first reaction vessel 11A and an eighth heating medium, in place of the regeneration heat exchanger 15A and the first heat recovery heat exchanger 17A. The second reaction vessel 11B is provided therein with a second heat exchanger 182 that performs heat exchange between a substance (e.g., calcium oxide or calcium hydroxide) in the second reaction vessel 11B and the eighth heating medium, in place of the regeneration heat exchanger 15A and the heat recovery heat exchanger 17B. The second container 12B is provided therein with a third heat exchanger 183 that performs heat exchange between a substance (e.g., water) in the second container 12B and the eighth heating medium.

The chemical heat accumulator of the present embodiment includes an eighth heating medium circuit 80 that circulates the eighth heating medium in the light and heat collecting device 2, the first to third heat exchangers 181 to 183, and the heat engine 6. On the outlet side of the light and heat collecting device 2 in the eighth heating medium circuit 80, there is connected a first pump 81 for circulating the eighth heating medium in the eighth heating medium circuit 80.

On the heating medium outlet side of the first pump 81, there is provided a branch part 82 that bifurcates a flow of the eighth heating medium flowing out of the first pump 81. One flow of the eighth heating medium bifurcated at the branch part 82 is let to flow into a first electric three-way valve 83, and the other flow of the eighth heating medium is let to flow into a second electric three-way valve 84.

The first and second electric three-way valves 83, 84 are heating medium circuit switching means whose operation is controlled by control voltage outputted from a control device (not shown).

For example, in an energized state in which power is supplied, the first electric three-way valve 83 switches the heating medium circuit to a heating medium circuit that allows communication between the heating medium outlet side of the light and heat collecting device 2 and a first heating medium inflow/outflow part 181*a* of the first heat exchanger 181. In a non-energized state in which power supply is stopped, the first electric three-way valve 83 switches the heating medium circuit to a heating medium circuit that allows communication between the first heating medium inflow/outflow part 181*a* of the first heat exchanger 181 and a heating medium inflow part 183*a* of the third heat exchanger 183.

In an energized state in which power is supplied, the second electric three-way valve 84 switches the heating medium circuit to a heating medium circuit that allows communication between the heating medium outlet side of the light and heat collecting device 2 and a first heating medium inflow/outflow part 182*a* of the second heat exchanger 182. In a non-energized state in which power supply is stopped, the second electric three-way valve 84 switches the heating medium circuit to a heating medium circuit that allows communication between the first heating medium inflow/outflow part 182*a* of the second heat exchanger 182 and a heating medium inlet side of a second pump 85.

The second pump 85 is employed for circulating the eighth heating medium in the eighth heating medium circuit 80. A heating medium outlet side of the second pump 85 is connected to the heating medium inlet side of the heat engine 6.

A heating medium outflow part 183*b* of the third heat exchanger 183 is in communication with a reservoir container 86 that absorbs variation in the volume of the eighth heating medium. A heating medium outlet side of the reservoir container 86 is in communication with a heating medium inlet side of a third pump 87 for circulating the eighth heating medium in the eighth heating medium circuit 80.

A heating medium outlet side of the third pump 87 is in communication with a third electric three-way valve 88. The third electric three-way valve 88 is a heating medium circuit switching means whose operation is controlled by control voltage outputted from a control device (not shown).

For example, in an energized state in which power is supplied, the third electric three-way valve 88 switches the heating medium circuit to a heating medium circuit that allows communication between a second heating medium inflow/outflow part 181*b* of the first heat exchanger 181 and the heating medium inlet side of the light and heat collecting device 2. In a non-energized state in which power supply is stopped, the third electric three-way valve 88 switches the heating medium circuit to a heating medium circuit that allows communication between a heating medium outlet side of the third pump 87 and the second heating medium inflow/outflow part 181*b* of the first heat exchanger 181.

A second heating medium inflow/outflow part 182*b* of the second heat exchanger 182 is connected with a fourth electric three-way valve 89. The fourth electric three-way valve 89 is a heating medium circuit switching means whose operation is controlled by control voltage outputted from a control device (not shown).

For example, in an energized state in which power is supplied, the fourth electric three-way valve 89 switches the heating medium circuit to a heating medium circuit that allows communication between the second heating medium inflow/outflow part 182*b* of the second heat exchanger 182 and the heating medium inlet side of the light and heat collecting device 2. In a non-energized state in which power supply is stopped, the fourth electric three-way valve 89 switches the heating medium circuit to a heating medium circuit that allows communication between the heating medium outlet side of the heat engine 6 and the second heating medium inflow/outflow part 182*b* of the second heat exchanger 182.

Next, an operation of the present embodiment having the above configuration will be described with reference to FIG. 16. First, an operation in the heat release mode will be described.

In the heat release mode, the first on-off valves 14A, 14B are fully opened; the second and third on-off valves 32A, 32B, 36A, 36B are fully closed; the second heating medium pump 42 and the second and third pumps 85, 87 are actuated; and the first pump 81 and the water pump 35 are stopped.

In the heat release mode, further, the first electric three-way valve 83 switches the heating medium circuit to the heating medium circuit in which the first heating medium inflow/outflow part 181*a* of the first heat exchanger 181 and the heating medium inflow part 183*a* of the third heat exchanger 183 are in communication with each other. The third electric three-way valve 88 switches the heating medium circuit to the heating medium circuit in which the heating medium outlet side of the third pump 87 and the second heating medium inflow/outflow part 181*b* of the first heat exchanger 181 are in communication with each other.

As indicated by solid line arrows in FIG. 16, consequently, a heating medium circuit through which the eighth heating medium circulates in a following manner is configured: the third pump 87→the third electric three-way valve 88→the first heat exchanger 181→the first electric three-way valve 83→the third heat exchanger 183→the reservoir container 86→the third pump 87.

In the heat release mode, further, the second electric three-way valve 84 switches the heating medium circuit to the heating medium circuit in which the first heating medium inflow/outflow part 182*a* of the second heat exchanger 182 and the heating medium inlet side of the second pump 85 are in communication with each other. The fourth electric three-way valve 89 switches the heating medium circuit to the heating medium circuit in which the heating medium outlet side of the heat engine 6 and the second heating medium inflow/outflow part 182*b* of the second heat exchanger 182 are in communication with each other.

As indicated by solid line arrows in FIG. 16, consequently, a heating medium circuit through which the eighth heating medium circulates in the following manner is configured: the second pump 85→the heat engine 6→the fourth electric three-way valve 89→the second heat exchanger 182→the second electric three-way valve 84→the second pump 85.

Accordingly, the water in the first container 12A is heated and vaporized by the heat stored in the heat accumulator 4, and the resulting water vapor flows into the first reaction vessel 11A through the connection passage 13A. In the first reaction vessel 11A, the calcium oxide housed in the first reaction vessel 11A and the water vapor flowing from the first container 12A react with each other. As a result, calcium hydroxide is produced and heat of reaction is generated.

The heat of reaction generated during the above reaction in the first reaction vessel 11A is transmitted to the second container 12B through the eighth heating medium, and thus the water housed in the second container 12B is heated and vaporized by the heat. The water vapor vaporized in the second container 12B flows into the second reaction vessel 11B through the connection passage 13B. In the second reaction vessel 11B, the calcium oxide housed in the second reaction vessel 11B and the water vapor flowing from the second container 12B react with each other. As a result, calcium hydroxide is produced and heat of reaction is generated. The heat of reaction generated during this reaction is transmitted to the heat engine 6 through the eighth heating medium.

Next, an operation in the heat storage mode will be described. The heat storage mode is carried out after the heat release mode.

In the heat storage mode, the second on-off valves 32A, 32B are fully opened; the first, third, and fourth on-off valves 14A, 14B, 36A, 36B are fully closed; the first pump 81 is actuated; and the second heating medium pump 42, the second and third pumps 85, 87, and the water pump 35 are stopped.

In the heat storage mode, further, the first electric three-way valve 83 switches the heating medium circuit to the heating medium circuit in which the heating medium outlet side of the light and heat collecting device 2 and the first heating medium inflow/outflow part 181*a* of the first heat exchanger 181 are in communication with each other. The third electric three-way valve 88 switches the heating medium circuit to the heating medium circuit in which the second heating medium inflow/outflow part 181*b* of the first heat exchanger 181 and the heating, medium inlet side of the light and heat collecting device 2 are in communication with each other.

As indicated by broken line arrows in FIG. 16, consequently, a heating medium circuit through which the eighth heating medium circulates in the following manner is configured: the first pump 81→the branch part 82→the first electric three-way valve 83→the first heat exchanger 181→the third electric three-way valve 88→the light and heat collecting device 2→the first pump 81.

In the heat storage mode, further, the second electric three-way valve 84 switches the heating medium circuit to the heating medium circuit in which the heating medium outlet side of the light and heat collecting device 2 and the first heating medium inflow/outflow part 182*a* of the second heat exchanger 182 are in communication with each other. The fourth electric three-way valve 89 switches the heating medium circuit to the heating medium circuit in which the second heating medium inflow/outflow part 182*b* of the second heat exchanger 182 and the heating medium inlet side of the light and heat collecting device 2 are in communication with each other.

As indicated by broken line arrows in FIG. 16, consequently, a heating medium circuit through which the eighth heating medium circulates in the following manner is configured: the first pump 81 the branch part 82→the second electric three-way valve 84→the second heat exchanger 182→the fourth electric three-way valve 89→the light and heat collecting device 2→the first pump 81.

Accordingly, the calcium hydroxide in the first and second reaction vessels 11A, 11B is heated by solar heat collected at the light and heat collecting device 2 and thus is separated into calcium oxide and water vapor. Therefore, the calcium hydroxide in the first and second reaction vessels 11A, 11B is regenerated into calcium oxide. In this way, solar heat can be stored.

Meanwhile, the water vapor produced in the first and second reaction vessels 11A, 11B flows into the condenser 3 through the condenser inlet passages 31A, 31B. The water vapor flowing into the condenser 3 is cooled and condensed by outside air and retained in the condenser 3:

The reservoir container 86 in the present embodiment has a volumetric capacity sufficient to house all the eighth heating medium existing in the portion of the eighth heating medium circuit 80 closed by the first electric three-way valve 83 and the third electric three-way valve 88, in the heat storage mode. Therefore, in the heat storage mode, the eighth heating medium existing in the closed circuit portion is retained in the reservoir container 86 and a state in which the first heat exchanger 181 are the third heat exchanger 183 are not filled with the eighth heating medium is established. Therefore, the operating efficiency of the chemical heat accumulator can be enhanced.

Next, an operation in the heat storage sustainment mode will be described. The heat storage sustainment mode is carried out after the heat storage mode.

The heat storage sustainment mode is different from the heat storage mode only in that the second on-off valves 32A, 32B are fully closed. The other on-off valves and pumps are set in the same condition as those in the heat storage mode. Therefore, the calcium oxide and the water are spatially isolated from each other, and thus the heat storage state can be sustained.

At this time, the third on-off valves 36A, 36B are fully opened and the water pump 35 is operated. The water retained in the condenser 3 can be thereby returned to the first and second containers 12A, 12B through the condenser outlet passage 33. After the water retained in the condenser 3 is all returned to the first and second containers 12A, 12B, the third on-off valves 36A, 36B are fully closed and the water pump 35 is stopped.

The above-mentioned step of returning the water retained in the condenser 3 to the first and second containers 12A, 12B may be carried out not only in the heat storage sustainment mode but also in the heat release mode and the heat storage mode.

According to the present embodiment, the number of heat exchangers in each of the first and second reaction vessels 11A, 11B can be reduced to one and thus the similar advantages as in the first embodiment can be obtained with a simple configuration.

(Other Embodiments)

The present invention is not limited to the above-described exemplary embodiments but can be implemented in various other ways without departing from the spirit of the invention. For example, the present invention can be implemented in the following manners:

(1) In the above-described embodiments, solar heat is exemplarily used as the external heat and the heat engine 6 is exemplarily used as the object to be heated. As another example, exhaust heat discharged from a factory or the like may be used as the external heat and a thermoelectric transducer or a reformer may be used as the object to be heated.

(2) In the above-described embodiments, the heat storage units 1A, 1B are exemplarily provided in two stages. As another example, the heat storage units may be provided in three or more stages.

(3) In the above-described seventh and ninth embodiments, the water is exemplarily used as the third reactant C and the calcium oxide is exemplarily used as the fourth reactant D. Alternatively, a combination of various substances that can be cooled by the seventh heating medium at a temperature lower than that of outside air can be used as the combination of the third reactant C and the fourth reactant D.

For example, absorbent, such as zeolite, silica gel, and activated carbon, can be used as the fourth reactant D, and water, ethanol, or the like can be used as the third, reactant C. A halide (calcium chloride, strontium bromide, or the like) of alkali earth metal may be used as the fourth reactant D and ammonia may be used as the third reactant C.

(4) In the above-described seventh and ninth embodiments, in the heat storage mode, the calcium hydroxide in the fourth reactant housing part 74 is heated by the first heating medium heated by solar heat, as an example. Alternatively, any other heat source may be used as long as it can supply heat at a temperature at which calcium hydroxide can be regenerated into calcium oxide.

(5) In the above-described embodiments, the heating medium is exemplarily used to thermally connect the first reaction vessel 11A and the second container 12B with each other. Alternatively, heat conduction or the like by a heat pipe, molten salt, or a solid, such as metal, may be employed.

(6) In the above-described embodiments, the heating medium is exemplarily used to thermally connect the second reaction vessel 11B and the object to be heated, such as the heat engine 6 and the high-temperature part 71a of the Stirling engine 71, with each other. Alternatively, heat transmission by fluid, such as gas, heat transmission by radiation, molten salt, or the like may be employed.

Additional advantages and modifications will readily occur to those skilled in the art. The invention in its broader term is therefore not limited to the specific details, representative apparatus, and illustrative examples shown and described.

What is claimed is:

1. A chemical heat accumulating system comprising:
first- to Mth-stage heat storage units, in which M is an integer equal to or greater than 2, wherein a respective heat storage unit including:
  a reaction vessel housing a first reactant and a regeneration heat exchanger that heats a compound using external heat generated outside of the reaction vessel;
  a container housing a second reactant; and
  a connection passage connecting the reaction vessel and the container with each other for guiding the second reactant housed in the container to the reaction vessel;
  an opening/closing member disposed in the connection passage and selectively opening and closing the connection passage; and
a condensing part configured to condense the second reactant in a gas state produced when the compound is separated in the reaction vessel of the respective heat storage unit, wherein
the reaction vessel of the Mth-stage heat storage unit is thermally connected with an object to be heated,
the reaction vessel of a (N−1)th-stage heat storage unit is thermally connected with the container of an Nth-stage heat storage unit through a heat or reaction transfer circuit, in which N is an integer equal to or greater than 2 and equal to or less than M,
the chemical heat accumulating system (i) heats, in a heat release mode, the object using heat of reaction generated when the first reactant and the second reactant are reacted with each other to produce the compound and (ii) stores, in a storage mode, heat by separating the compound into the first reactant and the second reactant using the external heat;

the container of the first-stage heat storage unit is thermally connected with a heating source lower in temperature than the external heat;

a maximum ultimate temperature [K] of the second reactant in the container of the (N−1)th-stage heat storage unit is lower than a critical temperature [K] of the second reactant, a saturated vapor pressure [Pa] of the second reactant in the container of the (N−1)th-stage heat storage unit at the critical temperature [K] is referred to as Pe1, a withstand pressure [Pa] of the (N−1)th-stage heat storage unit is referred to as Pv1, the (N−1)th-stage heat storage unit satisfies a relation of Pv1>Pe1, a maximum ultimate temperature [K] of the second reactant in the container of the Mth-stage heat storage unit is lower than the critical temperature [K] of the second reactant, a saturated vapor pressure [Pa] of the second reactant in the container of the Mth-stage heat storage unit at the critical temperature [K] is referred to as Pe2, a withstand pressure [Pa] of the Mth-stage heat storage unit is referred to as Pv2, the Mth-stage heat storage unit satisfies a relation of Pv2>Pe2, wherein in the heat release mode,
the opening/closing member of the respective heat storage unit is controlled to open,
the second reactant housed in the container of the (N−1)th-stage heat storage unit is heated, and the heated second reactant flows into the reaction vessel of the (N−1)th-stage heat storage unit through the opening/closing member of the (N−1)th-stage heat storage unit, whereby the heated second reactant reacts with the first reactant housed in the reaction vessel to produce the heat of reaction, and
the heat of reaction generated in the reaction vessel of the (N−1)th-stage heat storage unit is transmitted to the container of Nth-stage heat storage unit through the heat-of-reaction transfer circuit and heats the second reactant housed in the container, and then the heated second reactant flows into the reaction vessel of the Nth-stage heat storage unit through the opening/closing member of the Nth-stage heat storage unit, whereby the heated second reactant reacts with the first reactant housed in the reaction vessel to produce the heat of reaction.

2. The chemical heat accumulating system according to claim 1, wherein
the container of the first-stage heat storage unit is thermally connected with the reaction vessel of the first-stage heat storage unit.

3. The chemical heat accumulating system according to claim 1, wherein
the container of the first-stage heat storage unit is thermally connected with the container of a second-stage heat storage unit.

4. The chemical heat accumulating system according to claim 1, wherein the condensing part is a condenser having a thermal storage medium that stores heat of condensation generated when the second reactant in the gas state is condensed, and the heating source is provided by the condenser.

5. The chemical heat accumulating system according to claim 1, wherein the heating source is thermally connected with an external heat source that generates the external heat.

6. The chemical heat accumulating system according to claim 1, wherein in the respective heat storage unit, a maximum ultimate temperature Tm [K] of the second reactant in the container is equal to or higher than a critical temperature [K] of the second reactant, and the respective heat storage unit is configured such that a withstand pressure Pv [Pa] thereof satisfies a relation of $$Pv > znRTm/Vm,$$

in which n is a molecular weight [mol] of the second reactant in the containers; Vm is a volumetric capacity [m$^3$] of the container; z is a compressibility factor; and R is a gas constant.

7. The chemical heat accumulating system according to claim 1, wherein
the (N−1)th-stage heat storage unit and the Nth-stage heat storage unit are configured such that an amount of heat Qr(N−1) and an amount of heat QrN satisfy a relation of $$Qr(N-1) \cdot \Delta Hr/\Delta He < QrN < \{Qr(N-1) - Qr(N-1)HM \cdot (Ta(N-1) - Tair) - QeNHM \cdot (TaN - Tair)\} \cdot \Delta Hr/\Delta He,$$

in which ΔHr is the heat of reaction [J/mol] of a reaction that produces the compound from the first reactant and the second reactant;

ΔHe is latent heat of vaporization [J/mol] of the second reactant;

Qr(N−1)HM is a heat capacity [J/K] of the reaction vessel of the (N−1)th-stage heat storage unit;

QeNHM is a heat capacity [J/K] of the reaction vessel of the Nth-stage heat storage unit;

Ta(N−1) is a target temperature [K] in the reaction vessel of the (N−1)th-stage heat storage unit when the first reactant and the second reactant are reacted with each other;

TaN is a target temperature [K] in the reaction vessel of the Nth-stage heat storage unit when the first reactant and the second reactant are reacted with each other;

Tair is an outside air temperature [K];

Qr(N−1) is the amount of heat [J] generated by reacting the first reactant and the second reactant with each other in the reaction vessel of the (N−1)th-stage heat storage unit; and QrN is the amount of heat [J] generated by reacting the first reactant and the second reactant with each other in the reaction vessel of the Nth-stage heat storage unit.

8. The chemical heat accumulating system according to claim 1,
wherein the object is a high-temperature part of a heat engine that converts heat energy into kinetic energy, and
the heat engine includes the high-temperature part that heats and expands working gas and a low-temperature part that cools and contracts the working gas.

9. The chemical heat accumulating system according to claim 1,
wherein the first reactant is calcium oxide, and the second reactant is water.

10. The chemical heat accumulating system according to claim 1,
wherein the heating source connected to the container of the first-stage heat storage unit is the only heating source thermally connected directly to the container of the first-stage heat storage unit.

11. The chemical heat accumulating system according to claim 1, wherein the Pv1 is lower than the Pv2.

12. The chemical heat accumulating system according to claim 11, wherein the first reactant is calcium oxide, the second reactant is water, and N is 2.

13. The chemical heat accumulating system according to claim 1, wherein the maximum ultimate temperature of the second reactant in the container of the (N−1)th stage heat storage unit is always lower than the maximum ultimate temperature of the second reactant in the container of the Mth stage heat storage unit.

14. The chemical heat accumulating system according to claim 1, wherein the withstand pressure of the (N−1)th stage heat storage unit and the withstand pressure of the Mth stage heat storage unit are greater than atmospheric pressure.

15. The chemical heat accumulating system according to claim 1, wherein the respective heat storage unit further includes
   a condenser inlet passage that connects between the reaction vessel and the condensing part, and
   an on/off member disposed in the condenser inlet passage and selectively opens and closes the condenser inlet passage, wherein
   in the heat storage mode,
      the opening/closing member of the respective heat storage unit is controlled to close and the on/off member of the respective heat storage unit is controlled to open,
      the compound in the reaction vessel of the respective heat storage unit is heated with the external heat and is separated into the first reactant and the second reactant, and
      the second reactant generated in the reaction vessel of the respective heat storage unit flows into the condensing part through the condenser inlet passage to be condensed.

16. A method for chemically accumulating heat by a chemical heat accumulating system, the chemical accumulating system including:
   first- to Mth-stage heat storage units, in which M is an integer equal to or greater than 2, wherein the respective heat storage unit including:
      a reaction vessel housing the first reactant and a regeneration heat exchanger that heats a compound using external heat generated outside of the reaction vessel;
      a container housing a second reactant;
      a connection passage connecting the reaction vessel and the container with each other for guiding the second reactant housed in the container to the reaction vessel; and
      an opening/closing member disposed in the connection passage and selectively opening and closing the connection passage; and
   a condensing part configured to condense the second reactant in a gas state produced when the compound is separated in the reaction vessel of the respective heat storage unit, wherein
   the reaction vessel of the Mth-stage heat storage unit is thermally connected with the object to be heated,
   the reaction vessel of a (N−1)th-stage heat storage unit is thermally connected with the container of an Nth-stage heat storage unit through a heat-of-reaction transfer circuit, in which N is an integer equal to or greater than 2 and equal to or less than M, and
   the chemical heat accumulating system (i) heats, in a heat release mode, the object using heat of reaction generated when the first reactant and the second reactant are reacted with each other to produce the compound and (ii) stores, in a heat storage mode, heat by separating the compound into the first reactant and the second reactant using external heat, the method comprising:
   in the heat release mode,
      opening the opening/closing member of the respective heat storage unit,
      heating the second reactant housed in the container of the (N−1)th-stage heat storage unit, wherein the heated second reactant flows into the reaction vessel of the (N−1)th-stage heat storage unit through the opening/closing member of the (N−1)th-stage heat storage unit, whereby the heated second reactant reacts with the first reactant housed in the reaction vessel to produce the heat of reaction; and
      transmitting the heat of reaction generated in the reaction vessel of the (N−1)th-stage heat storage unit to the container of Nth-stage heat storage unit through the heat-of-reaction transfer circuit to heat the second reactant housed in the container, wherein the heated second reactant flows into the reaction vessel of the Nth-stage heat storage unit through the opening/closing member of the Nth-stage heat storage unit, whereby the heated second reactant reacts with the first reactant housed in the reaction vessel to produce the heat of reaction.

* * * * *